US011320559B2

(12) United States Patent
Bittar et al.

(10) Patent No.: US 11,320,559 B2
(45) Date of Patent: May 3, 2022

(54) STACKED SOFT MAGNETIC INSERTS AND SLOTTED SHIELD DESIGNS FOR TITLED COIL ANTENNAS

(71) Applicant: Halliburton Energy Services, Inc., Houston, TX (US)

(72) Inventors: Michael Bittar, Houston, TX (US); Jin Ma, Singapore (SG); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 411 days.

(21) Appl. No.: 16/462,162

(22) PCT Filed: Jan. 10, 2017

(86) PCT No.: PCT/US2017/012825
§ 371 (c)(1),
(2) Date: May 17, 2019

(87) PCT Pub. No.: WO2018/132085
PCT Pub. Date: Jul. 19, 2018

(65) Prior Publication Data
US 2019/0271792 A1    Sep. 5, 2019

(51) Int. Cl.
*G01V 3/28*    (2006.01)
*G01V 3/10*    (2006.01)
(Continued)

(52) U.S. Cl.
CPC .................. *G01V 3/28* (2013.01); *G01V 3/08* (2013.01); *G01V 3/10* (2013.01); *G01V 3/26* (2013.01);
(Continued)

(58) Field of Classification Search
CPC .......... G01V 3/24; G01V 3/10; E21B 47/002; E21B 49/00; E21B 47/12; E21B 47/00;
(Continued)

(56) References Cited

U.S. PATENT DOCUMENTS 6,566,881 B2    5/2003 Omeragic et al.
8,264,228 B2    9/2012 Bittar et al.
(Continued)

FOREIGN PATENT DOCUMENTS

WO    2016209270    12/2016
WO    2017065722    4/2017
(Continued)

OTHER PUBLICATIONS

ISRWO International Search Report and Written Opinion for PCT/US2017/012825 dated Sep. 28, 2017.

*Primary Examiner* — Alvaro E Fortich
*Assistant Examiner* — Zannatul Ferdous
(74) *Attorney, Agent, or Firm* — Benjamin Ford; C. Tumey Law Group PLLC

(57) ABSTRACT

An antenna assembly includes a tool mandrel having a tool axis, and a coil including a plurality of windings wrapped about the tool mandrel at a winding angle offset from the tool axis. A soft magnetic band radially interposes the coil and the tool mandrel and extends about a circumference of the tool mandrel at a band angle parallel to the winding angle. The soft magnetic band includes a plurality of stacked inserts extending perpendicular to the coil about the circumference of the tool mandrel and each stacked insert includes a plurality of rods positioned end-to-end.

20 Claims, 15 Drawing Sheets

(51) Int. Cl.
*H01Q 1/04* (2006.01)
*H01Q 7/08* (2006.01)
*H01Q 1/46* (2006.01)
*G01V 3/08* (2006.01)
*G01V 3/26* (2006.01)
*H01Q 7/06* (2006.01)
*H01Q 1/44* (2006.01)
*E21B 47/00* (2012.01)

(52) U.S. Cl.
CPC ................. *H01Q 1/04* (2013.01); *H01Q 1/46* (2013.01); *H01Q 7/06* (2013.01); *H01Q 7/08* (2013.01); *E21B 47/00* (2013.01); *H01Q 1/44* (2013.01)

(58) Field of Classification Search
CPC .. H01Q 7/06; H01Q 1/04; H01Q 1/46; H01Q 7/08; H01Q 1/44
See application file for complete search history.

(56) References Cited

U.S. PATENT DOCUMENTS

| | | |
|---|---|---|
| 2011/0074427 A1 | 3/2011 | Wang et al. |
| 2011/0316542 A1 | 12/2011 | Frey et al. |
| 2012/0249149 A1* | 10/2012 | Bittar .................. H01Q 1/04 324/337 |
| 2014/0292340 A1* | 10/2014 | Yang .................. G01V 3/28 324/338 |
| 2016/0356146 A1 | 12/2016 | Gard et al. |
| 2017/0052273 A1* | 2/2017 | Yang .................. G01V 3/30 |
| 2017/0102478 A1* | 4/2017 | Yang .................. G01V 3/30 |
| 2017/0362925 A1* | 12/2017 | Zhang .................. E21B 47/00 |

FOREIGN PATENT DOCUMENTS

| | | |
|---|---|---|
| WO | 2017069742 | 4/2017 |
| WO | 2018132086 | 7/2018 |

* cited by examiner

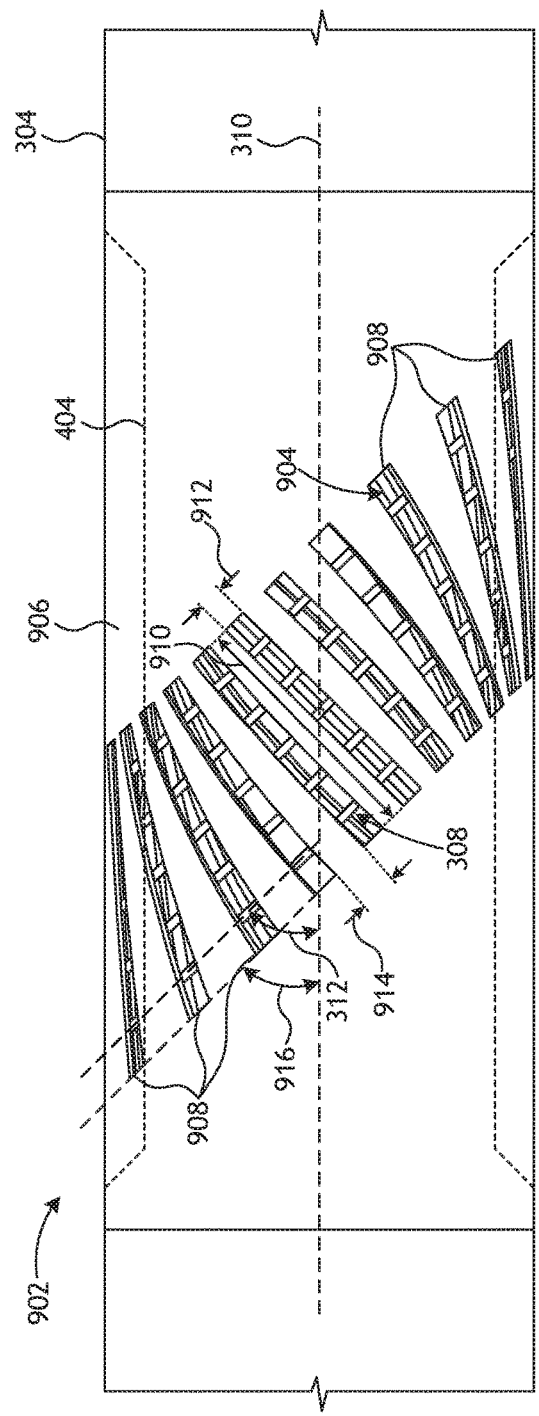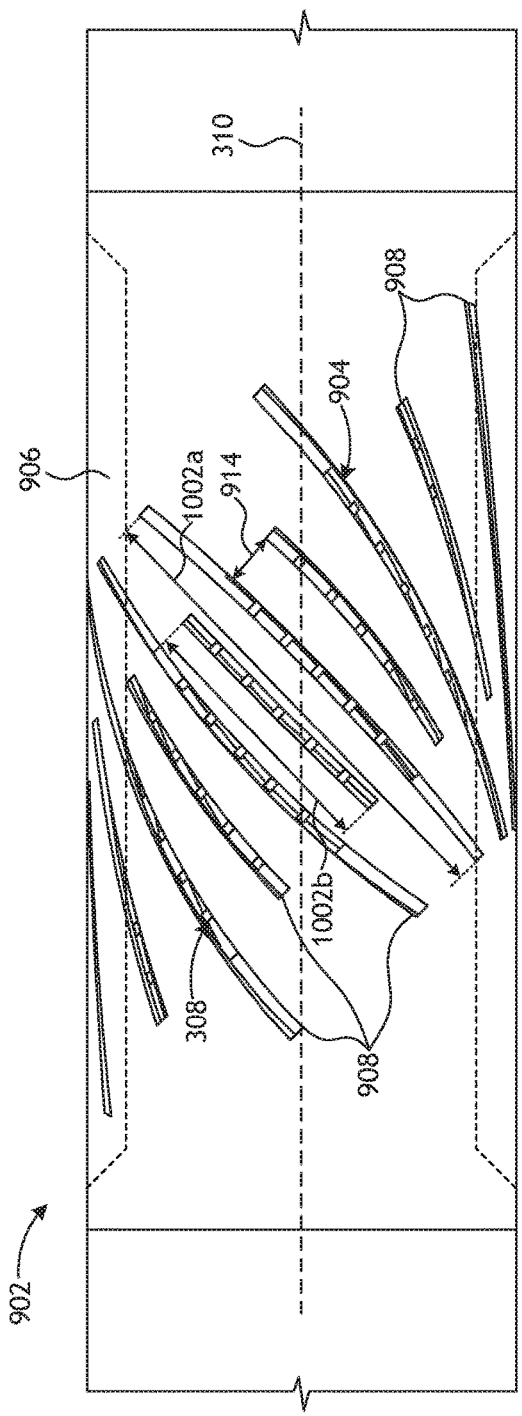

| Frequency | Dipole Response Air Coil Antenna | 1st Antenna Assembly without Shield | 2nd Antenna Assembly with Shield - 24 Slots with 1 Length | 3rd Antenna Assembly with Shield - 24 Slots with 2 Lengths |
|---|---|---|---|---|
| 500 Hz | 1 | 1.5037 | 0.8620 | 1.1792 |
| 1 kHz | 1 | 1.4821 | 0.6856 | 1.0608 |
| 2 kHz | 1 | 1.4631 | 0.5719 | 0.9572 |
| 8 kHz | 1 | 1.4298 | 0.4550 | 0.7855 |
| 32 kHz | 1 | 1.4059 | 0.3996 | 0.6790 |
| | | 4th Antenna Assembly without Shield - Stacked Inserts | 5th Antenna Assembly with Shield - 24 Slots Stacked Inserts | 6th Antenna Assembly with Shield - 24 Slots Stacked Inserts |
| 500 Hz | 1 | 1.0546 | 0.8878 | 1.0458 |
| 1 kHz | 1 | 1.0256 | 0.7532 | 0.9853 |
| 2 kHz | 1 | 1.0005 | 0.6453 | 0.9183 |
| 8 kHz | 1 | 0.9594 | 0.5194 | 0.7749 |
| 32 kHz | 1 | 0.9335 | 0.4560 | 0.6756 |

FIG. 15

|  | Dipole Response Air Coil Antenna | 24 Slots | | 36 Slots | |
|---|---|---|---|---|---|
|  |  | 1st Antenna Assembly 24 Stacked Inserts [Misaligned] | 2nd Antenna Assembly 24 Stacked Inserts [Aligned] | 3rd Antenna Assembly 36 Stacked Inserts [Misaligned] | 4th Antenna Assembly 36 Stacked Inserts [Aligned] |
| 2 kHz | 1 | 0.7301 | 0.7609 | 0.9072 | 0.9104 |
| 4 kHz | 1 | 0.6662 | 0.6947 | 0.8518 | 0.8547 |
| 8 kHz | 1 | 0.6114 | 0.6376 | 0.7973 | 0.8001 |
| 16 kHz | 1 | 0.5687 | 0.5927 | 0.7506 | 0.7534 |
| 32 kHz | 1 | 0.5385 | 0.5607 | 0.7154 | 0.7180 |

FIG. 16

| Dipole Response Air Coil Antenna | 24 Slots<br>1st Antenna Assembly<br>48x3 Stacked Inserts | 2nd Antenna Assembly<br>36x4 Stacked Inserts | 36 Slots<br>3rd Antenna Assembly<br>36x3 Stacked Inserts | 4th Antenna Assembly<br>36x4 Stacked Inserts |
|---|---|---|---|---|
| 2 kHz | 1 | 0.9067 | 0.9834 | 0.9205 | 1.0921 |
| 4 kHz | 1 | 0.8211 | 0.8894 | 0.8652 | 1.0258 |
| 8 kHz | 1 | 0.7478 | 0.8087 | 0.8098 | 0.9581 |
| 16 kHz | 1 | 0.6901 | 0.7448 | 0.7619 | 0.8987 |
| 32 kHz | 1 | 0.6486 | 0.6987 | 0.7255 | 0.8526 |

FIG. 17

STACKED SOFT MAGNETIC INSERTS AND SLOTTED SHIELD DESIGNS FOR TITLED COIL ANTENNAS

BACKGROUND

During drilling operations for the extraction of hydrocarbons, a variety of recording and transmission techniques are used to provide or record real-time data from the vicinity of a drill bit. Measurements of surrounding subterranean formations may be made throughout drilling operations using downhole measurement and logging tools, such as measurement-while-drilling (MWD) tools, which aid in making operational decisions, and logging-while-drilling (LWD) tools, which help characterize the formations. LWD tools in particular obtain measurements used to determine the electrical resistivity (or its inverse, conductivity) of the surrounding subterranean formations being penetrated, where the electrical resistivity indicates various geological features of the formations. These resistivity measurements may be taken using one or more antennas coupled to or otherwise associated with the wellbore logging tools. Such data can also be obtained while not drilling, such as in a wireline logging operations.

Logging tool antennae are often formed by positioning coil windings about an axial section of the wellbore logging tool, such as a drill collar. A soft magnetic material is sometimes positioned beneath the coil windings to increase the efficiency and/or sensitivity of the logging tool antennae. The soft magnetic material facilitates a higher magnetic permeability path (i.e., a flux conduit) for the magnetic field generated by the coil windings, and helps shield the coil windings from adjacent drill collars and associated losses (e.g., eddy currents generated on the drill collars).

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 9 is a side view of an antenna assembly that includes an example antenna shield.

FIG. 10 is a side view of the antenna assembly of FIG. 9 that includes an embodiment of the antenna shield incorporating one or more principles of the present disclosure.

FIG. 15 is a table showing comparative test results obtained from two variations in antenna shield designs in conjunction with varying the design of an underlying soft magnetic band.

FIG. 16 is a table showing comparative test results obtained from variations in antenna assembly designs having stacked inserts aligned and misaligned with the slots in an antenna shield.

FIG. 17 is a table showing comparative test results obtained from variations in antenna assembly designs having a soft magnetic band comprising stacked inserts with varying numbers of rods.

DETAILED DESCRIPTION

The present disclosure relates generally to wellbore logging tools used in the oil and gas industry and, more particularly, to the design of tilted coil antennas using stacked soft magnetic inserts and innovative antenna shields that improve gain, sensitivity, and efficiency of the tilted coil antennas.

Embodiments of the present disclosure describe improvements to the design of antenna assemblies used in resistivity logging tools for monitoring surrounding subterranean formations adjacent a drilled wellbore. Some of the antenna assemblies described herein include tilted coil antennas that include a soft magnetic band to increase the inductance of the tilted coil antenna. In such assemblies, the soft magnetic band includes a plurality of stacked inserts extending perpendicular to the tilted coil antenna and each stacked insert includes a plurality of rods positioned end-to-end. The rods included in each stacked insert are of a simple design and commercially available and, therefore, help reduce the cost of assembling and maintaining the antenna assemblies as compared to antenna assemblies having soft magnetic bands with inserts that exhibiting complex geometries that are difficult and expensive to manufacture.

Other antenna assemblies described herein include a tilted coil antenna and an antenna shield positioned radially outward from the tilted coil antenna. The antenna shield defines a plurality of slots extending perpendicular to the windings of the tilted coil antenna and the plurality of slots is provided in two or more dissimilar lengths. The dissimilar lengths for the slots not only support operation of the antenna assemblies by minimizing attenuation of electromagnetic fields and preserving the dipole orientation of the tilted coil antenna, but also in preserving the mechanical integrity and strength to protect the tilted coil antenna.

Figure 1:
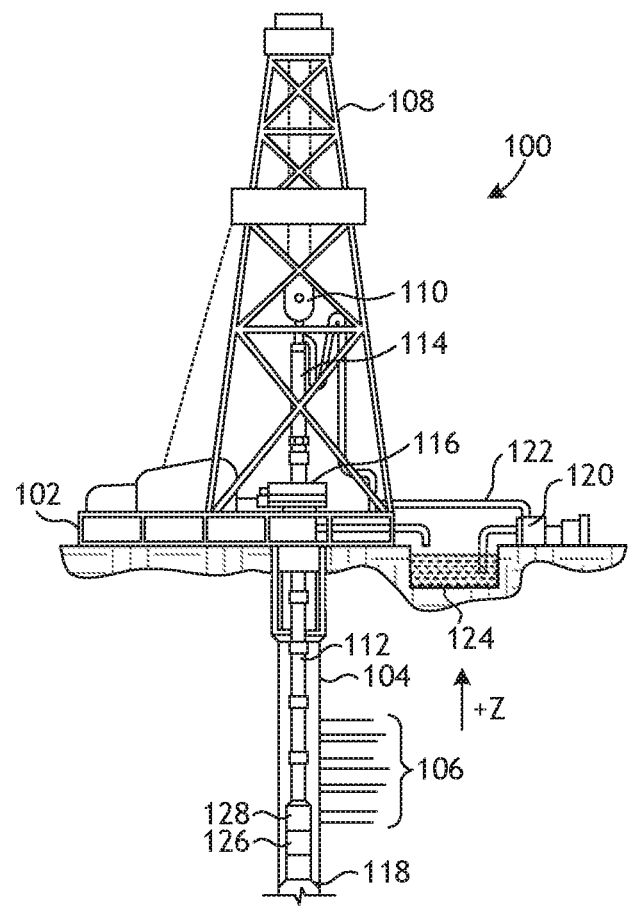
FIG. 1 is a schematic diagram of an example drilling system that may employ the principles of the present disclosure.

FIG. 1 is a schematic diagram of an example drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one resistivity logging tool 126, which may comprise one or more antennas capable of receiving and/or transmitting one or more electromagnetic (EM) signals that are axially spaced along the length of the resistivity logging tool 126. As described below, the resistivity logging tool 126 may further comprise a plurality of stacked soft magnetic inserts used to enhance and/or shield the EM signals and thereby increase the azimuthal sensitivity of the resistivity logging tool 126.

As the drill bit 118 extends the wellbore 104 through the formations 106, the resistivity logging tool 126 may continuously or intermittently collect azimuthally-sensitive measurements relating to the resistivity of the formations 106, i.e., how strongly the formations 106 opposes a flow of electric current. The resistivity logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the resistivity logging tool 126 may also be stored within the resistivity logging tool 126 or the telemetry module 128 for later retrieval at the surface upon retracting the drill string 112.

Figure 2:
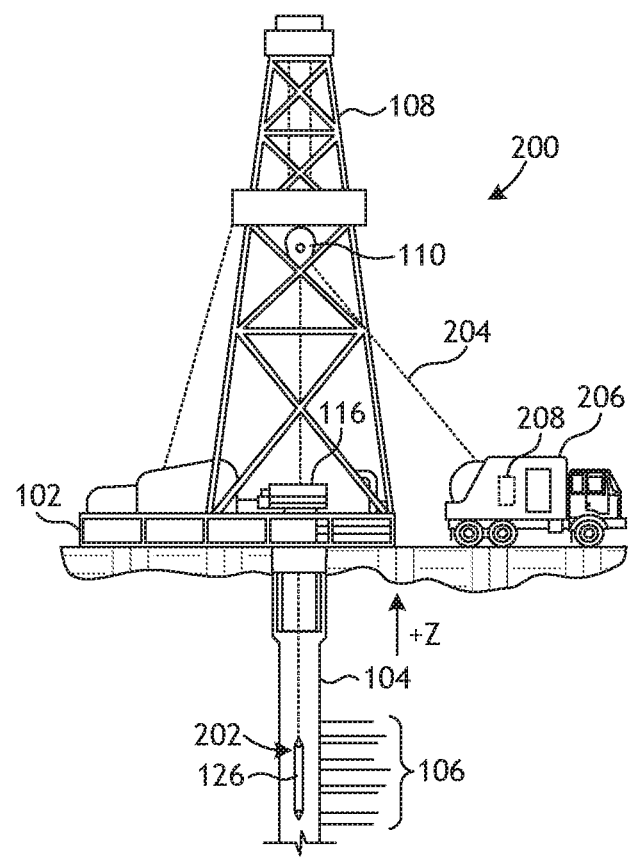
FIG. 2 is a schematic diagram of an example wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an example wireline system 200 that may employ the principles of the present disclosure, according to one or more embodiments. Like numerals used in FIGS. 1 and 2 refer to the same components or elements and, therefore, may not be described again in detail. As illustrated, the wireline system 200 may include a wireline instrument sonde 202 that may be suspended in the wellbore 104 on a cable 204. The sonde 202 may include the resistivity logging tool 126 described above, which may be communicably coupled to the cable 204. The cable 204 may include conductors for transporting power to the sonde 202 and also facilitate communication between the surface and the sonde 202. A logging facility 206, shown in FIG. 2 as a truck, may collect measurements from the resistivity logging tool 126, and may include computing and data acquisition systems 208 for controlling, processing, storing, and/or visualizing the measurements gathered by the resistivity logging tool 126. The computing and data acquisition systems 208 may be communicably coupled to the resistivity logging tool 126 by way of the cable 204.

Figure 3A:
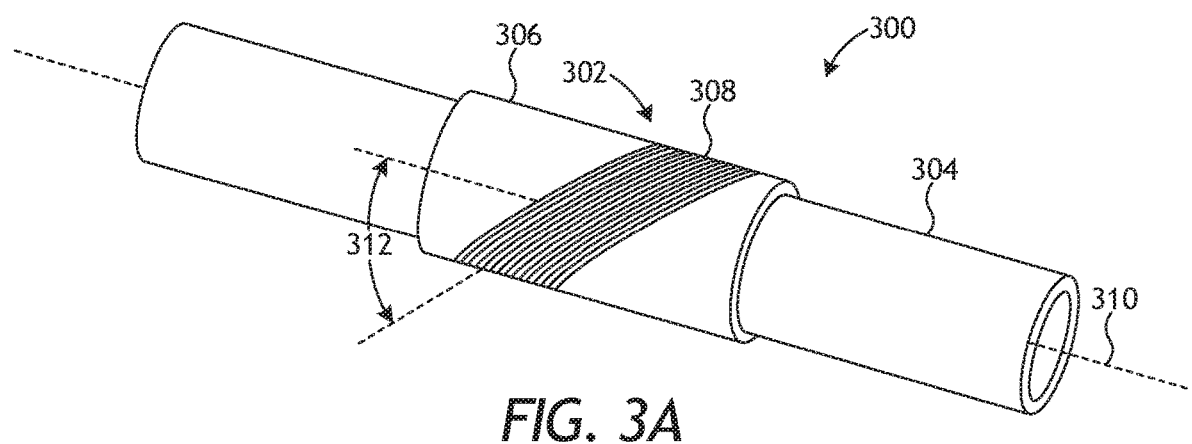
FIG. 3A is a partial isometric view of an example wellbore logging tool.

FIG. 3A is a partial isometric view of an example wellbore logging tool 300, according to one or more embodiments. The logging tool 300 may be the same as or similar to the resistivity logging tool 126 of FIGS. 1 and 2 and, therefore, may be used in the drilling or wireline systems 100, 200 depicted therein. The wellbore logging tool 300 is depicted as including an antenna assembly 302 that can be positioned about a tool mandrel 304, such as a drill collar or the like. The antenna assembly 302 may include a bobbin 306 and a coil 308 wrapped about the bobbin 306 and extending axially by virtue of winding along at least a portion of an outer surface of the bobbin 306.

The bobbin 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The bobbin 306 can be fabricated, for example, by additive manufacturing (i.e., 3D printing), molding, injection molding, machining, or other known manufacturing processes.

The coil 308 can include any number of consecutive "turns" (i.e. windings of the coil 308) about the bobbin 306, but typically will include at least a plurality (i.e. two or more) consecutive full turns, with each full turn extending 360° about the bobbin 306. In some embodiments, a pathway for receiving the coil 308 may be formed along the outer surface of the bobbin 306. For example, one or more grooves or channels may be defined in the outer surface of the bobbin 306 to receive and seat the coil 308. In other embodiments, however, the outer surface of the bobbin 306 may be smooth or even. The coil 308 can be concentric or eccentric relative to a tool axis 310 of the tool mandrel 304.

As illustrated, a portion of the turns or windings of the coil 308 extend about the bobbin 306 at a winding angle 312 offset relative to the tool axis 310. More specifically, the windings of the coil 308 on opposing sides of the bobbin 306 extend about the outer circumference of the bobbin 306 at the winding angle 312. The windings, however, transition to perpendicular to the tool axis 310 at the top and bottom of the bobbin 306, at which point the windings transition back to the winding angle 312 on opposing sides of the bobbin 306. Successive windings of the coil 308 (i.e., one or more successive revolutions of the coil 308) advance in a generally axial direction along at least a portion of the outer surface of the bobbin 306 such that coil 308 spans an axial length of the bobbin 308. The antenna assembly 302 may be characterized and otherwise referred to as a "tilted coil" or "directional" antenna. In the illustrated embodiment, the winding angle 312 is 45°, by way of example, and could alternatively be any angle offset relative to the tool axis 310, without departing from the scope of the disclosure.

Figure 3B:
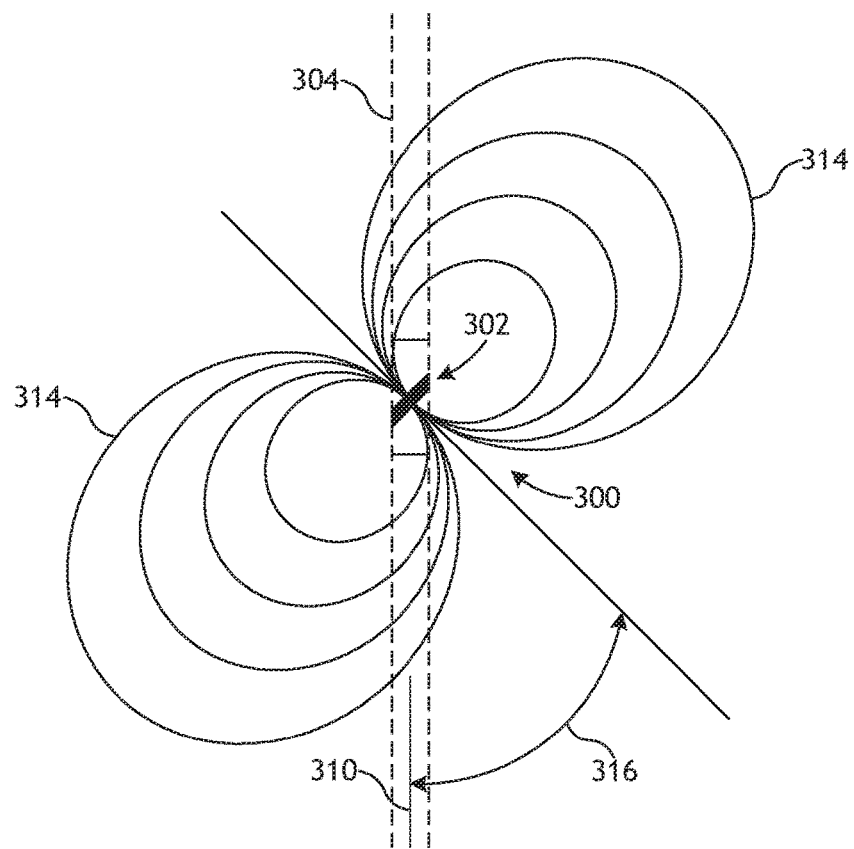
FIG. 3B is a schematic side view of the magnetic flux from the wellbore logging tool of FIG. 3A.

FIG. 3B is a schematic side view of the wellbore logging tool 300 of FIG. 3A. When current is passed through the coil 308 of the antenna assembly 302, a dipole magnetic field 314 may be generated that extends radially outward from the antenna assembly 302 orthogonal to the winding direction.

As a result, the antenna assembly 302 may exhibit a magnetic field angle 316 with respect to the tool mandrel 304 and, since the winding angle 312 (FIG. 3A) is 45°, the resulting magnetic field angle 316 will also be 45° offset from the tool axis 310. As will be appreciated, however, the magnetic field angle 316 may be varied by adjusting or manipulating the winding angle 312.

Figure 4:
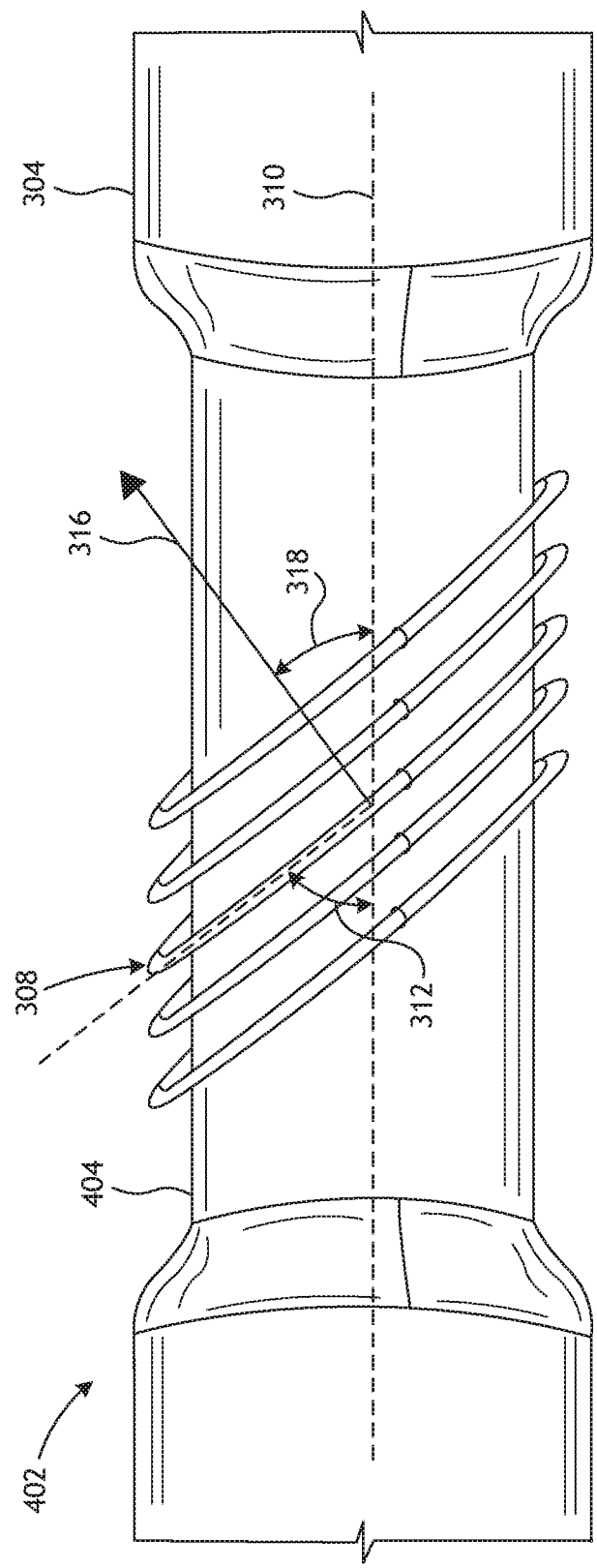
FIG. 4 depicts a side view of an example antenna assembly.

FIG. 4 depicts a side view of an example antenna assembly 402. The antenna assembly 402 may be similar in some respects to the antenna assembly 302 of FIGS. 3A-3B and, therefore, may be best understood with reference thereto, where like numerals represent like element not described again. As illustrated, the antenna assembly 402 includes the coil 308 wrapped about the tool mandrel 304 and, more particularly, within a saddle 404 defined on the tool mandrel 304. The saddle 404 may comprise a portion of the tool mandrel 304 that exhibits a reduced-diameter as compared to the remaining portions of the tool mandrel 304. Some or all of the components of the antenna assembly 402 may be arranged within the saddle 404. While not shown in this embodiment, the bobbin 306 (FIG. 3A) may alternatively be included to interpose the coil 308 and the tool mandrel 304 (i.e., the saddle 404), as generally discussed above.

As illustrated, the windings of the coil 308 extend about the circumference of the tool mandrel 304 at the winding angle 312, which may be offset from the tool axis 310, for example, by 45°. As a result, the magnetic dipole moment 316 generated by the coil 308 may extend from the tool mandrel 304 at the magnetic field angle 318, which is orthogonal to the winding angle 312 of the coil 308. The directionality of the magnetic dipole moment 316 may generally correspond to the direction in which the coil 308 emits the dipole magnetic field 314 (FIG. 3B) when current is passed therethrough. In some applications, it may be desired for best results to have the magnetic dipole moment 316 offset from the tool axis 310 by 45°, but the magnetic field angle 318 could alternatively be any angle between parallel and perpendicular to the tool axis 310 because of effects caused by the tool mandrel 304 or as a result of using a soft magnetic band, as described below.

Figure 5A:
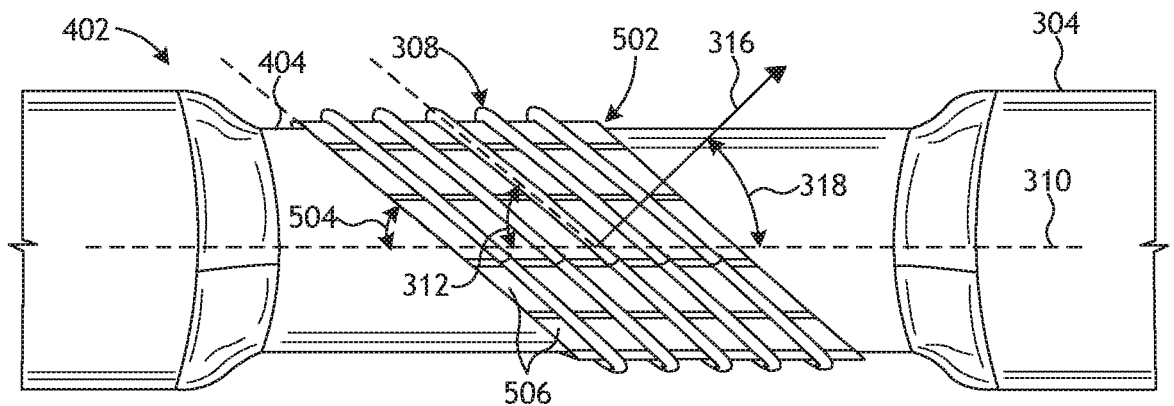
FIG. 5A depicts a side view of another example embodiment of the antenna assembly of FIG. 4.

FIG. 5A depicts another embodiment of the antenna assembly 402. In the illustrated embodiment, a soft magnetic band 502 interposes the coil 308 and the tool mandrel 304 within the saddle 404. The soft magnetic band 502 may be configured to shield the coil winding 308 from eddy currents generated by the tool mandrel 304, thereby increasing the azimuthal sensitivity of the antenna assembly 402 and/or increasing the efficiency or strength of the dipole magnetic field 314 (FIG. 3B) of the coil 308.

To facilitate this effect, the soft magnetic band 502 may comprise a soft magnetic material or any material that exhibits relatively high resistivity, high magnetic permeability, and low magnetic loss (e.g., hysteresis, magnetostriction, etc.). One suitable soft magnetic material that may be used includes ferrites, which generally comprise a composite mixture of a powder iron/ferrite material and a binder, such as a silicone-based rubber, an elastomer, an RTV, a polymer (such as polyimide), a ceramic, or an epoxy. The resulting mixture is molded and/or pressed into desired geometric shapes and configurations that conform to the shape of the soft magnetic band 502. Other suitable soft magnetic materials that may be used in the soft magnetic band 502 include, but are not limited to, mu-metal, permalloy, metallic glass (metglass), or any combination of the foregoing.

The soft magnetic band 502 may comprise a generally annular ring that extends about the circumference of the tool mandrel 304 (e.g., within the saddle 404) at a band angle 504. In the illustrated embodiment, the band angle 504 and the winding angle 312 are substantially the same such that the soft magnetic band 502 interposes the coil 308 and the tool mandrel 304 about the corresponding circumference of the tool mandrel 304. To help maintain the directionality of the magnetic dipole moment 316 at 45° relative to the tool axis 310, the soft magnetic band 502 may comprise a plurality of strips or inserts 506. Accordingly, in the illustrated example, the soft magnetic band 502 comprises a plurality of inserts 506 that form a discontinuous annular ring extending about the circumference of the tool mandrel 304 at the band angle 504. As illustrated, the band angle 504 and the winding angle 312 are substantially parallel, but could alternatively be offset from parallel by +/−10°, without departing from the scope of the disclosure.

Figure 5B:
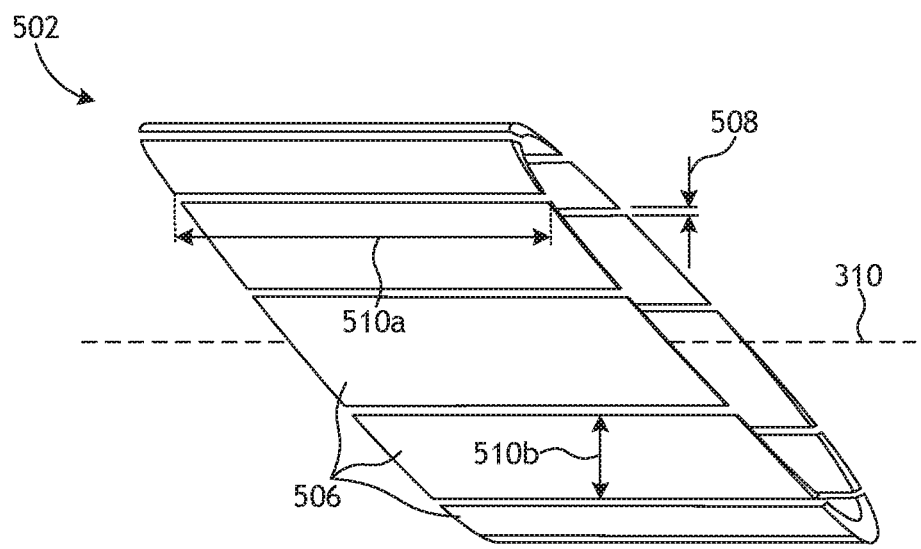
FIG. 5B is an isometric view of the soft magnetic band of FIG. 5A.

FIG. 5B is an isometric view of the soft magnetic band 502 of FIG. 5A. As illustrated, the inserts 506 exhibit a tilted cut shape and, therefore, may be referred to as "tilted" inserts 506. Moreover, the inserts 506 are cut and otherwise formed axially and otherwise parallel to the tool axis 310. Each insert 506 may be separated from angularly adjacent inserts by a small gap 508 that prevents physical contact between angularly adjacent inserts 506, and thereby prevents a continuous magnetic path between the adjacent inserts 506. In some embodiments, the gap 508 may be filled with a material that exhibits a relative permeability ($\mu_r$) of approximately 1, which is equivalent to the permeability of free space or air ($\mu_o$). In such embodiments, for example, the inserts 506 may be positioned (inserted) within corresponding channels defined in the bobbin 306 (FIG. 3A) where the gap 508 is filled by separators provided by the bobbin 306. In other embodiments, the gap 508 may not be filled with any particular material but may instead allow air to separate the adjacent inserts 506. In any case, the gap 508 essentially serves as a non-magnetic insulator between the adjacent inserts 506.

As illustrated, the inserts 506 comprise generally rectangular or parallelogram-shaped members (depending on where angularly located about the circumference of the tool mandrel 304) separated by the gap 508. Each insert 506 may have a length 510a and a width 510b, where the length 510a of each axially cut insert 506 extends substantially parallel to the tool axis 310. As a result, the gap 508 separating each laterally adjacent insert 506 may be aligned axially with the tool axis 310 and otherwise run parallel thereto. Moreover, each insert 506 may exhibit an arcuate shape across (along) the width that conforms to the curvature of the tool mandrel 304 (FIG. 5A) and/or the saddle 404 (FIG. 5A).

Figure 6A:
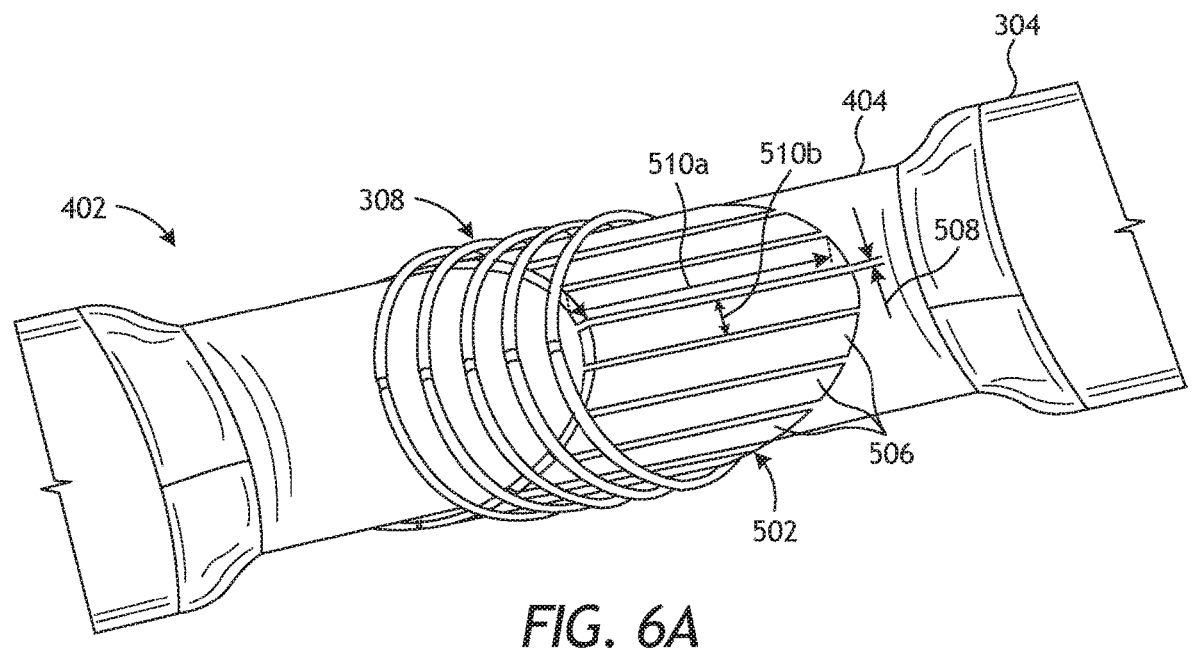
FIGS. 6A and 6B are isomeric and side views, respectively, of another example embodiment of the antenna assembly of FIG. 4.
Figure 6B:
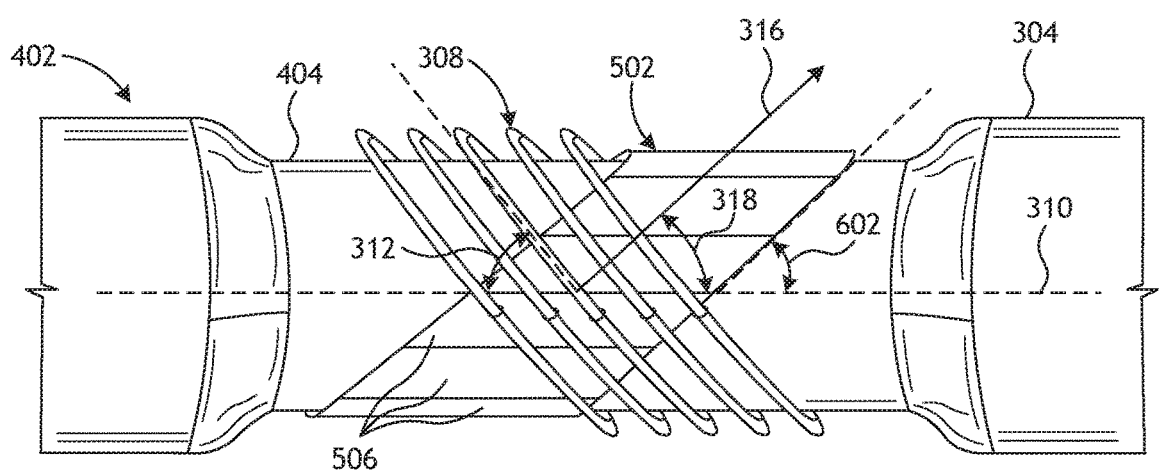

Referring now to FIGS. 6A and 6B, illustrated are isometric and side views, respectively, of another example embodiment of the antenna assembly 402. Similar to the embodiments of FIGS. 4 and 5A-5B, the antenna assembly 402 includes the coil 308 wrapped about the tool mandrel 304 and, in some embodiments, positioned within the saddle 404. The windings of the coil 308 extend about the tool mandrel 304 at the winding angle 312 (FIG. 6B), which, as noted above, may be angularly offset from the tool axis 310 (FIG. 6B) by 45°, but could alternatively be any angle offset from the tool axis 310. As a result, the magnetic dipole moment 316 (FIG. 6B) generated by the coil 308 may extend from the tool mandrel 304 at the magnetic field angle 318 (FIG. 6B), which is orthogonal to the winding angle 312.

Similar to the embodiment of FIGS. 5A-5B, the soft magnetic band 502 radially interposes the coil 308 and the tool mandrel 304 (e.g., the saddle 404), and the inserts 506 are separated by the gaps 508 (FIG. 6A), which extend substantially parallel to the tool axis 310. Unlike the embodiment of FIGS. 5A-5B, however, the soft magnetic band 502 extends about the circumference of the tool mandrel 304 (e.g., the saddle 404) at a band angle 602 (FIG. 6B) that is orthogonal to the winding angle 312. Accordingly, the soft magnetic band 502 may not only be characterized as "tilted" with respect to the tool axis 310, but may also be referred to as a "reversed" soft magnetic band. In embodiments where the winding angle 312 is 45° offset from the tool axis 310, the band angle 602 may also be 45° offset from the tool axis 310, but angularly opposite the winding angle 312 along the tool axis 310 (i.e., 90° offset from the winding angle 312). Since the coil 308 and the soft magnetic band 502 are each wrapped about the circumference of the tool mandrel 304 in orthogonal directions, at least a portion of the coil 308 extends axially past the soft magnetic band 502 where the soft magnetic band 502 does not radially interpose the coil 308 and the tool mandrel 304.

Each insert 506 of the soft magnetic band 502 exhibits a unique cross-section that must conform to the curvature of the tool mandrel 304 and/or the saddle 404. Consequently, it can be difficult and expensive to manufacture the inserts 506 since each insert 506 has to be custom made, which increases the overall manufacturing and assembling costs for the antenna assembly 402. According to one or more embodiments of the present disclosure, soft magnetic band inserts that are difficult to manufacture on account of requiring complex geometries can be replaced with inexpensive, commercially available (i.e., off-the-shelf) soft magnetic band inserts that exhibit a simple geometry. As discussed below, using such commercially available soft magnetic band inserts with simple geometry can achieve the same or better antenna performance as compared to the embodiment of FIGS. 6A-6B.

Figure 7A:
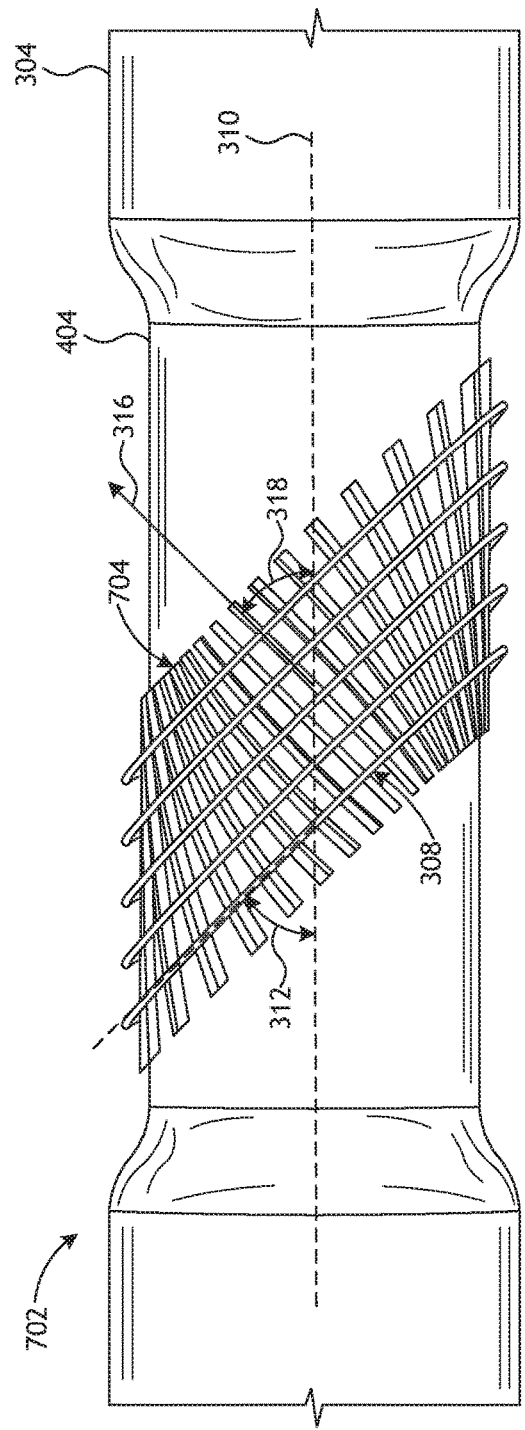
FIG. 7A is a side view of an example antenna assembly that incorporates one or more principles of the present disclosure.

FIG. 7A is a side view of an example antenna assembly 702 that incorporates one or more principles of the present disclosure. The antenna assembly 702 may be similar in some respects to the embodiments of the antenna assembly 402 shown in FIGS. 4, 5A-5B, and 6A-6B and, therefore, may be best understood with reference thereto, where similar numerals refer to like elements or components not described again. Similar to the embodiments of the antenna assembly 402, for example, the antenna assembly 702 includes the coil 308 wrapped about the tool mandrel 304 and, in at least some embodiments, positioned within the saddle 404. The windings of the coil 308 extend about the tool mandrel 304 at the winding angle 312, which, as noted above, may be angularly offset from the tool axis 310 by 45°, but could alternatively be any angle offset from the tool axis 310. As a result, the magnetic dipole moment 316 generated by the coil 308 extends from the tool mandrel 304 at the magnetic field angle 318, which is orthogonal to the winding angle 312. While the coil 308 is depicted as having only four consecutive windings, it will be appreciated that more or less than four windings may be employed in the antenna assembly 702, without departing from the scope of the disclosure.

Figure 7B:
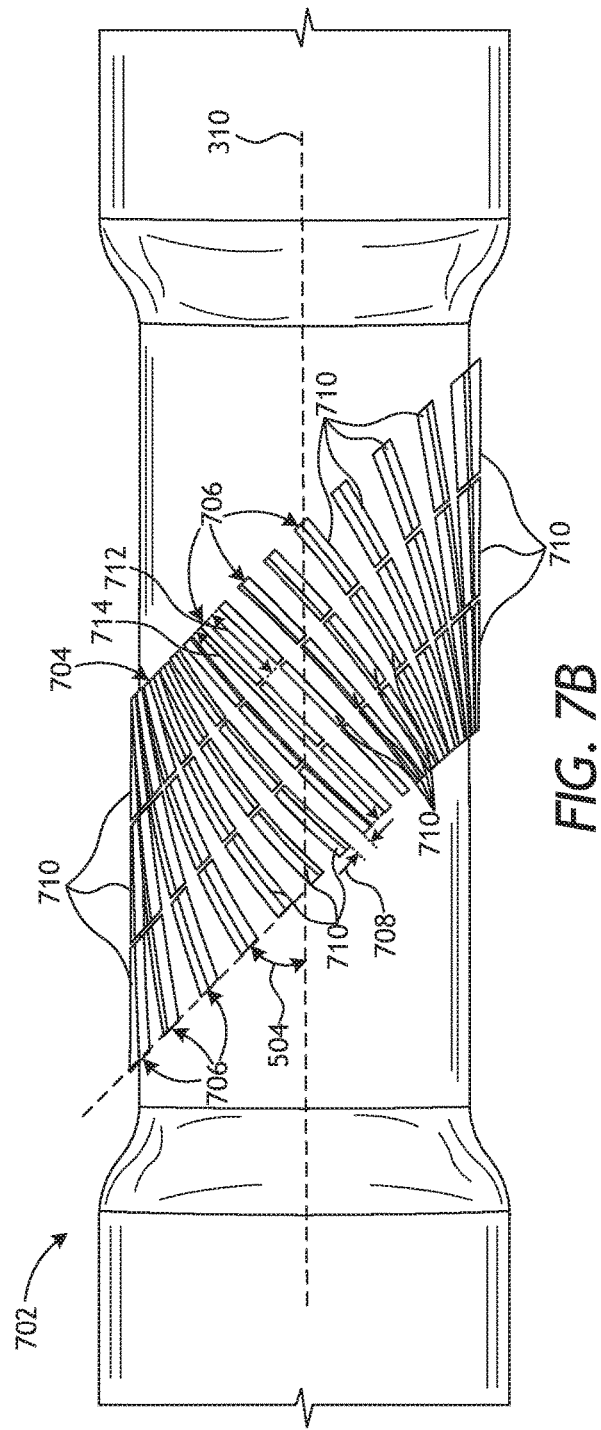
FIG. 7B is a side view of the antenna assembly of FIG. 7A without the coil.

The antenna assembly 702 also includes a soft magnetic band 704 that radially interposes the coil 308 and the tool mandrel 304 (e.g., the saddle 404). FIG. 7B is a side view of the antenna assembly 702 of FIG. 7A excluding the coil 308 to facilitate a better view of the novel features of the soft magnetic band 704. In the illustrated embodiment, the soft magnetic band 704 comprises a plurality of stacked inserts 706 angularly offset from each other to form a discontinuous annular ring that extends about the circumference of the tool mandrel 304 (e.g., within the saddle 404) at the band angle 504. The band angle 504 and the winding angle 312 (FIG. 7A) are substantially the same such that the soft magnetic band 704 interposes the coil 308 and the tool mandrel 304 about the entire circumference of the tool mandrel 304.

Each stacked insert 706 is separated from angularly adjacent stacked inserts by a gap 708, which is similar to the gap 508 discussed above with reference to FIGS. 4, 5A-5B, and 6A-6B. Accordingly, the gaps 708 prevent physical contact between angularly adjacent stacked inserts 706.

As illustrated, each stacked insert 706 includes a plurality of rods 710 (alternately referred to as "units") arranged and otherwise positioned end-to-end (i.e., "stacked") to cooperatively form a straight or substantially straight stacked insert 706. The rods 710 may be made of any of the soft magnetic materials mentioned herein with respect to the soft magnetic band 502 of FIGS. 5A-5B and 6A-6B including, but not limited to, ferrite, mu-metal, permalloy, metallic glass (metglass), or any combination thereof. In some embodiments, as illustrated, three rods 710 may be arranged end-to-end to jointly (mutually) form a given stacked insert 706. In other embodiments, however, more or less than three rods 710 (at least two) may be arranged end-to-end to form a given stacked insert 706. Moreover, in some embodiments, a small gap may be formed between opposing ends of the rods 710. In other embodiments, however, the opposing ends of one or more of the rods 710 in a given stacked insert 706 may come into contact and otherwise directly touch each other.

The rods 710 of each stacked insert 706 are arranged such that the stacked insert 706 extends substantially perpendicular to the windings of the radially adjacent coil 308 (FIG. 7A) at any given angular location about the circumference of the tool mandrel 304. As a result, the soft magnetic band 704 helps to maintain the directionality of the magnetic dipole moment 316 (FIG. 7A) at 45° relative to the tool axis 310 (FIG. 7A). As used herein, the phrase "substantially perpendicular" refers to a 90° relative offset between the stacked insert 706 and the windings of the radially adjacent coil 308, but also encompasses a +/−10° offset from perpendicular, without departing from the scope of the disclosure.

The rods 710 of each stacked insert 706 may comprise straight, cylindrical members that provide a circular or polygonal cross-section. In other words, each rod 710 may exhibit a cross-sectional shape that is circular, such as rounded, oval, or ovoid, or alternatively a cross-sectional shape that is polygonal, such as, triangular, rectangular (including square), pentagonal, etc. In the illustrated example the rods 710 are depicted as cylindrical members with a polygonal (e.g., rectangular) cross-section. In some embodiments, a given stacked insert 706 may comprise rods 710 having dissimilar cross-sectional shapes, without departing from the scope of the disclosure.

Each rod 710 may have a length 712 that contributes to the total length 714 of the corresponding stacked insert 706. The length 712 of a given rod 710 may or may not be the same as the length 712 of other rod(s) 710 in a corresponding stacked insert 706. For example, the length 712 of any of the rods 710 can range between about 1.0 inch and 5.0 inches, but could alternatively be shorter than 1.0 inch or longer than 5.0 inches, without departing from the scope of the disclosure. In at least one embodiment, the length 712 of the rods 710 will be less than half of the elliptical circumferences of the tool mandrel 304 (e.g., the saddle 404) along the designed path of the stacked inserts 706. Consequently, in such embodiments, the range of the length 712 of the rods 710 may depends on the diameter of the tool mandrel 304 (e.g., within the saddle 404). The relatively short length 712 of the rods 710 allows the corresponding stacked insert 706 to roughly but substantially follow the curvature of the outer surface of the tool mandrel 304 (e.g., the saddle 404) as it extends perpendicular to the coil 308.

The rods 710 may be commercially available as an off-the-shelf item and may comprise standard sizes that can be purchased in the market from a variety of manufacturers and/or outlets. For example, the rods 710 may be purchased from CWS Bytemark of Orange, Calif., USA, or Dexter Magnetic Technologies, Inc. of Elk Grove Village, Ill., USA. As will be appreciated, using commercially available rods 710 to form the stacked inserts 706 may reduce costs in assembling and maintaining the antenna assembly 702 as compared to conventional or prior antenna assemblies where the soft magnetic band comprises inserts exhibiting complex geometries that are difficult and expensive to manufacture. For example, prior art soft magnetic bands can cost as much as US $20 k per antenna, while soft magnetic bands using the stacked inserts 706 described herein may cost only US $100 per antenna. Moreover, as discussed below, employing the stacked inserts 706 may provide similar or better gain performance as compared to conventional or prior antenna assemblies with custom-made soft magnetic bands.

Figure 8A:
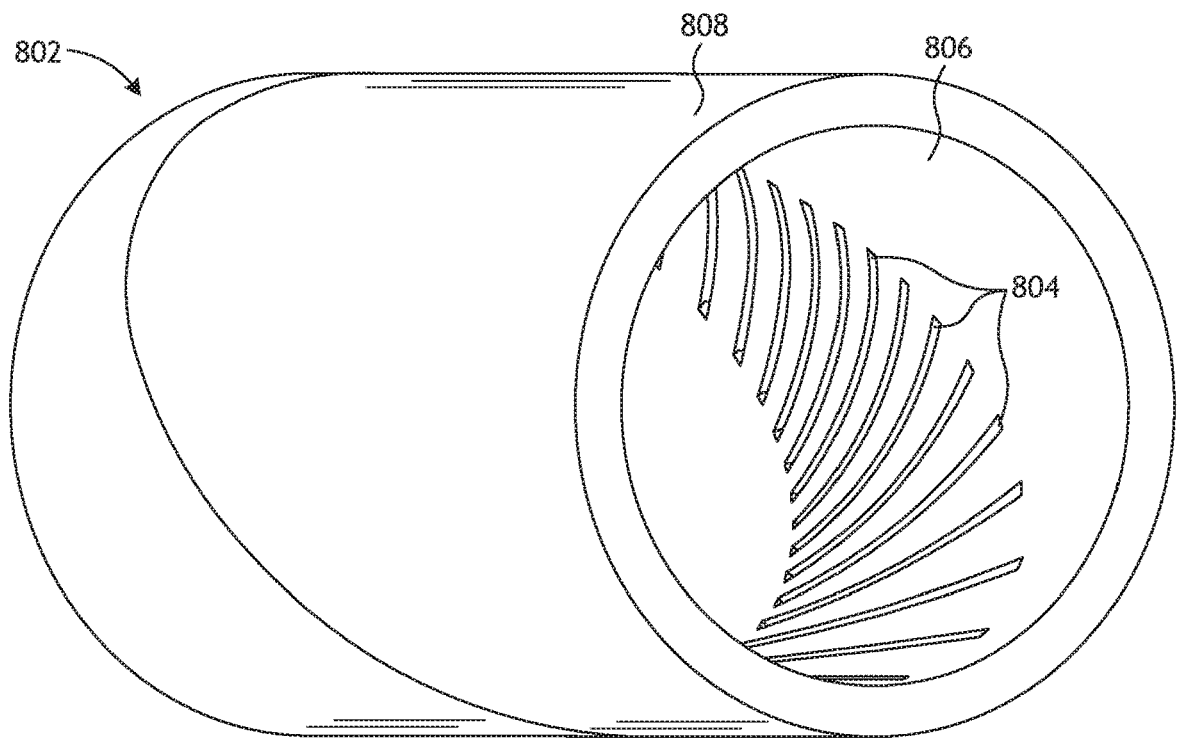
FIG. 8A is an isometric view of an example bobbin.

FIG. 8A depicts an isometric view of an example bobbin 802, according to one or more embodiments of the present disclosure. The bobbin 802 may be the same as or similar to the bobbin 306 described above with reference to FIG. 3A and, therefore, may be made of similar materials mentioned herein. While the stacked inserts 706 of the soft magnetic band 704 of FIGS. 7A and 7B are shown positioned about the outer circumference of the mandrel 304 (e.g., the saddle 404), the stacked inserts 706 may alternatively be positioned on and otherwise attached to the bobbin 802. In turn, the bobbin 802 may be positioned about the outer circumference of the mandrel 304, such as within the saddle 404. In the illustrated embodiment, for example, the bobbin 802 may have a plurality of grooves or channels 804 defined on its inner radial surface 806. Each channel 804 may be sized and otherwise configured to receive a single stacked insert 706 (FIG. 7B). In such embodiments, the coil 308 (FIG. 7A) would be wound about the outer radial surface 808 of the bobbin 802.

Figure 8B:
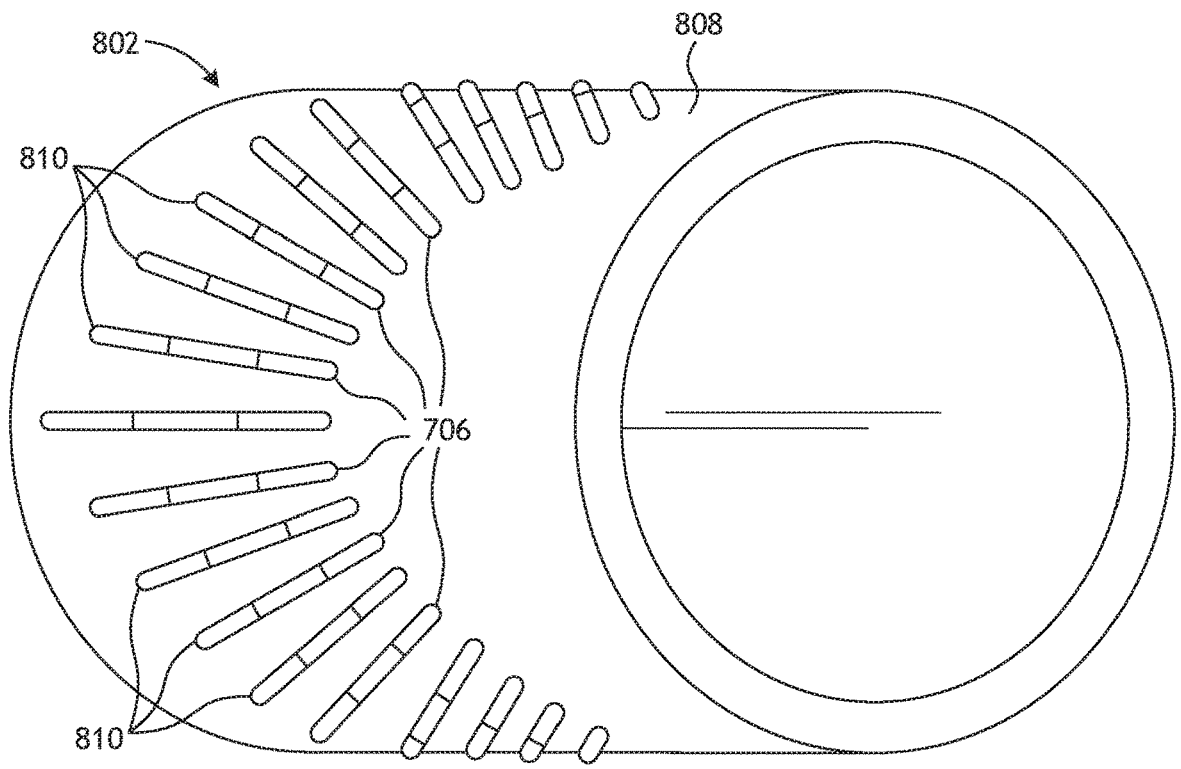
FIG. 8B depicts an isometric view of another embodiment of the bobbin of FIG. 8A.

FIG. 8B depicts an isometric view of another embodiment of the bobbin 802 of FIG. 8A. In FIG. 8B, the stacked inserts 706 are shown arranged on the outer radial surface 808 of the bobbin 802. In at least one embodiment, the stacked inserts 706 may be at least partially received within corresponding channels 810 defined in the outer radial surface 808 of the bobbin 802. In other embodiments, however, the outer radial surface 808 of the bobbin 802 may be smooth and the stacked inserts 706 may alternatively be arranged directly on the outer radial surface 808. In such embodiments, the coil 308 (FIG. 7A) may be wound about the outer radial surface 808 of the bobbin 802 but radially supported by the stacked inserts 706.

Referring again to FIG. 7A, it may be desired to protect the antenna assembly 702 (especially the coil 308) from mechanical or operational damage during use. For example, an unprotected (unshielded) coil 308 may be damaged during wellbore drilling operations through prolonged exposure to wellbore cuttings and debris or by extensive contact with a wellbore wall as an associated drill string is moved within the wellbore. In some embodiments, the coil 308 may be protected from mechanical damage by covering or otherwise coating all or a portion of the antenna assembly 702 with a non-magnetic, electrically insulating/non-conductive material such as, but not limited to, a polymer (e.g., PEEK), a polymer-ceramic blend, or a ceramic. This material may be added (deposited), for example, within the reduced diameter portion of the tool mandrel 304 defined by the saddle 404. The material is electrically resistive and, therefore, can protect the antenna assembly 702 while not attenuating the electromagnetic fields transmitted or received.

In other embodiments, however, the coil 308 may be protected from mechanical damage by using or otherwise installing an antenna shield that axially spans the reduced diameter portion of the tool mandrel 304 defined by the saddle 404 and effectively covers the coil 308. The antenna shield may be electromagnetically transmissive to allow transmission of electromagnetic signals. In some embodiments, the electromagnetic transmissivity of the antenna shield may be achieved by providing slots defined through the body of the antenna shield.

FIG. 9 is a side view of an antenna assembly 902 that includes an example antenna shield 906 used to protect the antenna assembly 902 (especially the underlying coil 308). The antenna assembly 902 may be the same as or similar to any of the antenna assemblies 402 (FIGS. 4, 5A-5B, and 6A-6B) and 702 (FIGS. 7A-7B) described herein and, therefore, may be best understood with reference thereto, where similar numerals refer to like elements or components not described again. The antenna assembly 902, for example, includes the coil 308 wrapped about the tool mandrel 304 and, in at least some embodiments, positioned within the saddle 404 (shown in dashed lines). The windings of the coil 308 extend about the tool mandrel 304 at the winding angle 312.

The antenna assembly 902 also includes a soft magnetic band 904 radially interposing the coil 308 and the tool mandrel 304 (e.g., the saddle 404). In the illustrated embodiment, the soft magnetic band 904 is similar to the soft magnetic band 704 of FIGS. 7A-7B, but could alternatively comprise any of the soft magnetic band embodiments discussed herein or other soft magnetic band designs and configurations altogether, without departing from the scope of the disclosure.

The antenna shield 906 provides a circumferential encapsulation of the internal components of the antenna assembly 902 by extending about the tool axis 310. More specifically, the antenna shield 906 is positioned radially outward from the coil 308 and the soft magnetic band 904. As illustrated, the antenna shield 906 can axially span the axial length of the saddle 404 and is secured to (or otherwise engages) the tool mandrel 304 at its opposing axial ends. In some embodiments, the antenna shield 906 may be designed such that a relatively smooth structural transition is achieved between the antenna shield 906 and the outer diameter of the tool mandrel 304 at the opposing axial ends of the antenna shield 906.

In some embodiments, the antenna shield 906 can be formed of a non-conductive and/or non-metallic material, such as fiberglass or a polymer (e.g., polyether ether ketone or "PEEK"). In other embodiments, however, the antenna shield 906 can be made of a conductive and/or metallic material, such as stainless steel, a nickel-based alloy (e.g., MONEL®, INCONEL®, etc.), a chromium-based alloy, a copper-based alloy, or any combination thereof.

The antenna shield 906 also includes a plurality of slots 908 defined through the body of the antenna shield 906. The slots 908 facilitate electromagnetic transmissivity of the antenna shield 906 by providing areas where electromagnetic signals can penetrate the antenna shield 906 to be received or transmitted. In the illustrated embodiment, each slot 908 is formed in the shape of a rectangle, but could alternatively exhibit other shapes, without departing from the scope of the disclosure. Each slot 908 has a length 910 and a width 912, and is separated from angularly adjacent slots 908 by a separation gap 914. The separation gap 914 may or may not be uniform between all angularly adjacent slots 908. The slots 908 are formed in the antenna shield 906 such that each slot 908 extends perpendicular or substantially perpendicular to the radially adjacent coil 308 at any given angular location about the circumference of the tool mandrel 304. Consequently, the length 910 of each slot 908 extends perpendicular to the radially adjacent windings of the coil 308. As used herein, the phrase "substantially perpendicular" refers to a 90° relative offset between the slots 908 and the radially adjacent coil 308, but also encompasses a +/−10° offset from a truly perpendicular relationship, without departing from the scope of the disclosure.

In the illustrated embodiment, the length 910 of each slot 908 is constant (the same) and the pattern of the slots 908 (including the magnitude of the separation gaps 914) is constant about the entire circumference of the antenna shield 906. The slots 908 cooperatively form a discontinuous annular ring that extends about the circumference of the antenna shield 906 at a slot angle 916. The slot angle 916 and the winding angle 312 are substantially the same such that the slots 908 are arranged radially outward from the coil 308 at any given angular location about the circumference of the tool mandrel 304.

The slots 908 help reduce the gain loss from the antenna shield 906, while also reserving the winding (tilt) angle 312 of the coil 308. The slots 908 of FIG. 9, however, are not optimized to provide maximum gain while maintaining acceptable mechanical integrity and strength for the antenna shield 906. Rather, the slot design shown in FIG. 9 constitutes a uniform pattern of similarly sized and arranged slots 908 about the circumference of the antenna shield 906.

FIG. 10 is a side view of the antenna assembly 902 that includes an embodiment of the antenna shield 906 that incorporates one or more principles of the present disclosure. As will be discussed below, one way to increase the gain sensitivity of the antenna assembly 902 is to increase the length of the slots 908 in the antenna shield 906. However, due to mechanical constraints of the structure of the antenna shield 906, it is prohibitive to simply increase the length of all the slots 908 to a maximum, which might adversely affect the structural integrity of the antenna shield 906 and render it unsuitable for downhole use.

Similar to the embodiment of FIG. 9, each slot 908 of the antenna shield 906 of FIG. 10 is separated from angularly adjacent slots 908 by the separation gap 914. Unlike the embodiment of FIG. 9, however, the slots 908 of the antenna shield 906 of FIG. 10 are defined and otherwise provided in at least two dissimilar lengths extending perpendicular to the winding angle 312 (FIG. 9). More specifically, as illustrated, one or more slots 908 exhibit a first length 1002a and one or more additional (other) slots 908 exhibit a second length 1002b, where the first length 1002a is longer than the second length 1002b. The magnitude (size) of the first and second lengths 1002a,b may depend on the material used for the antenna shield, the axial length of the coil 308, and other structural parameters of the antenna shield 906. Having at least two dissimilar lengths 1002a,b helps minimize the gain loss through the antenna shield 906 but also maintains the structural integrity and strength of the antenna shield 906.

Figure 11:
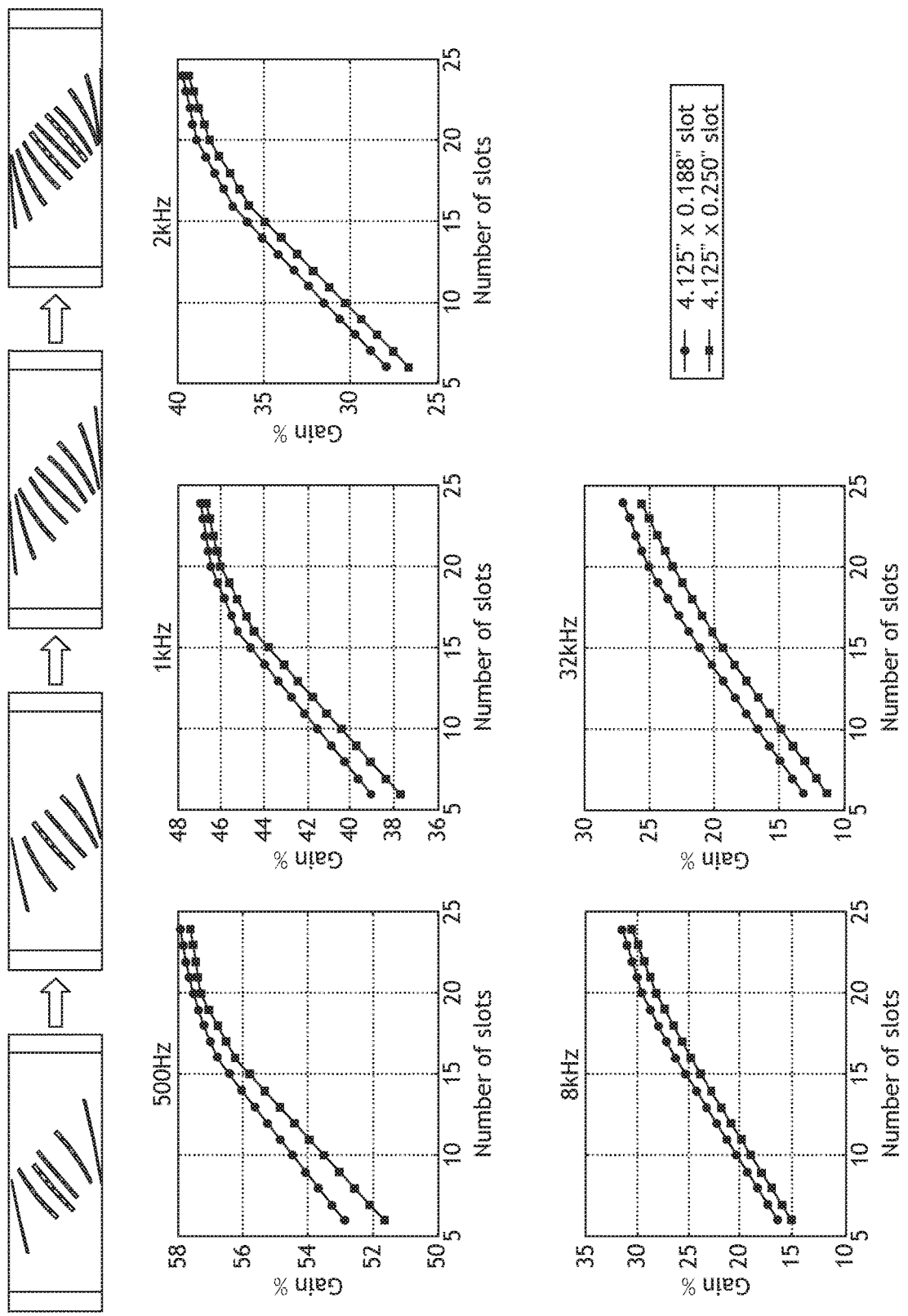
FIGS. 11-13 depict test results obtained by varying shield parameters on an antenna assembly.
Figure 12:
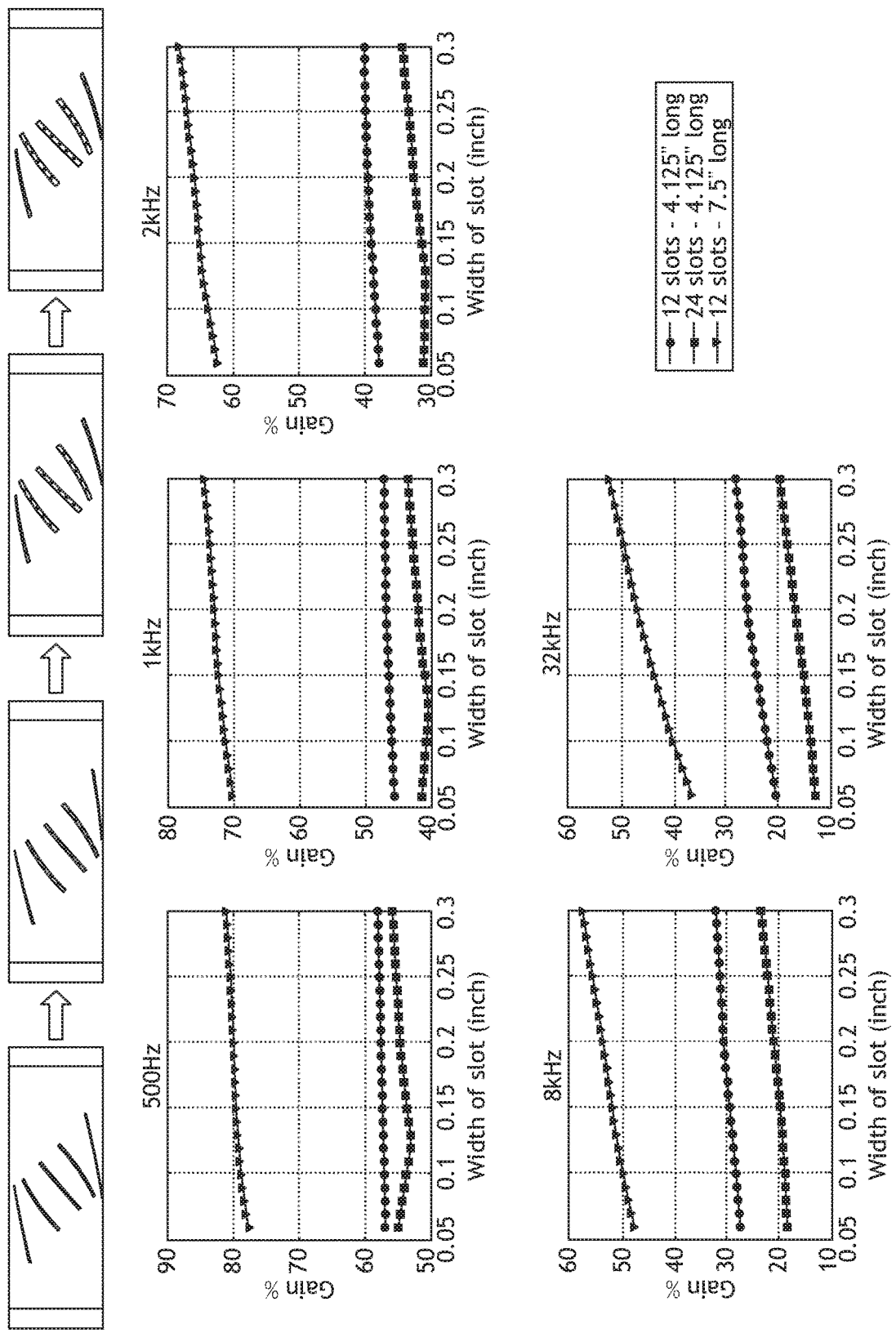
Figure 13:
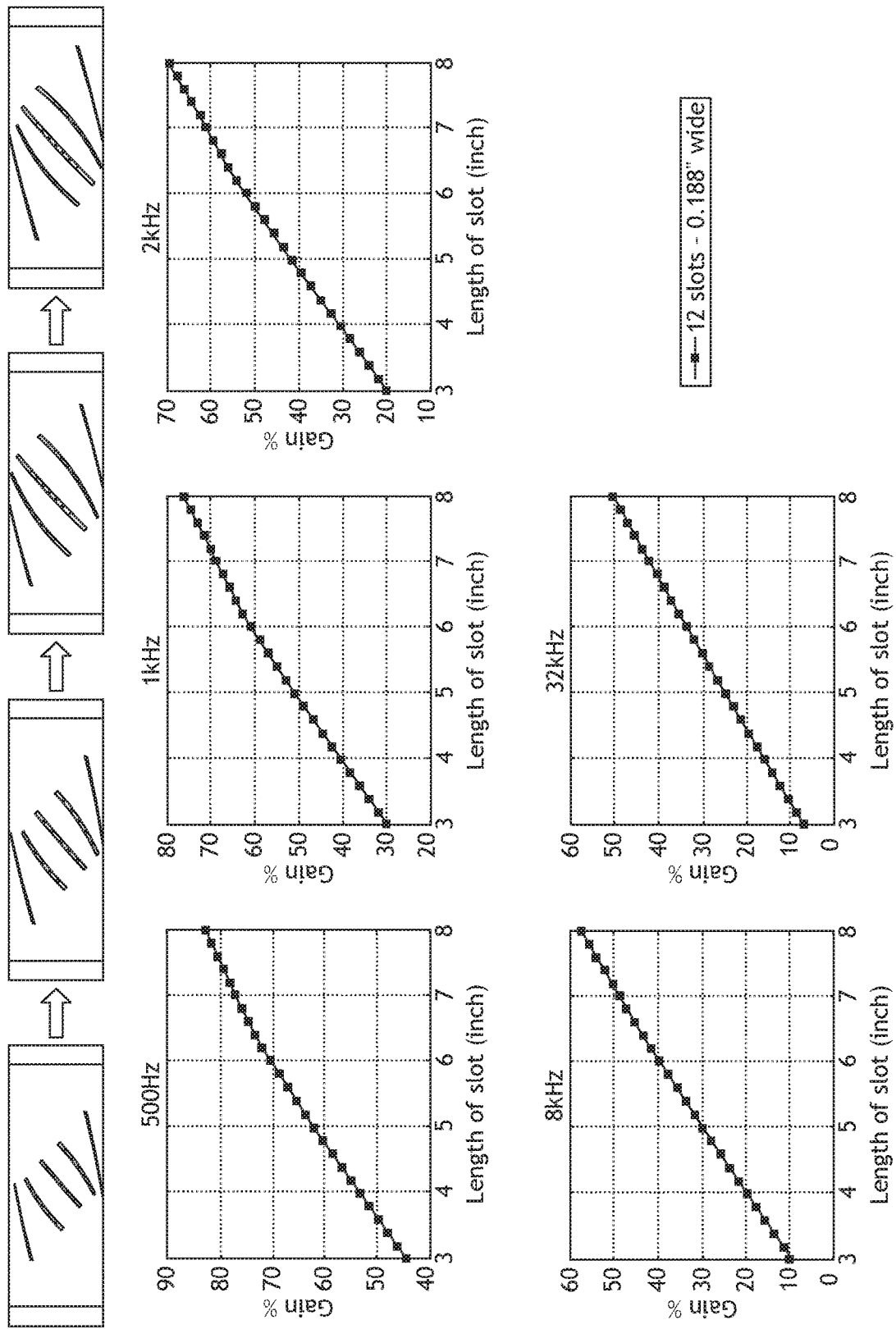

In principle, and based on conclusions derived from the tests shown in FIGS. 11-13, the slots 908 having the first length 1002a should be as long as possible under the condition that all such slots 908 should not merge at one end and otherwise maintain a minimum distance at one end. The slots 908 having the second length 1002b may interpose the longer slots 908 and may also be as long as possible under the condition that all such slots 908 should not merge with the longer slots 908 and also maintain a minimum distance between the longer slots 908.

In some embodiments, as illustrated, the slots 908 may be defined (arranged) in a slot pattern where the first and second lengths 1002a,b alternate about the circumference of the antenna shield 906 in a one-to-one ratio. More particularly, a slot 908 having the second length 1002b interposes each angularly adjacent pair of slots 908 having the first length 1002a, or vice versa, where a slot 908 having the first length 1002a interposes each angularly adjacent pair of slots 908 having the second length 1002b.

In other embodiments, however, the slots 908 may be defined in a slot pattern where the first and second lengths 1002a,b alternate about the circumference of the antenna shield 906 in a two-to-two ratio. In such embodiments, two slots 908 having the first length 1002a may be succeeded by two slots 908 having the second length 1002b in a continuous alternating pattern about the circumference of the antenna shield 906.

In yet other embodiments, the slots 908 may be defined in a slot pattern where the first and second lengths 1002a,b alternate about the circumference of the antenna shield 906 in a two-to-one ratio. In such embodiments, two or more slots 908 having the second length 1002b may interpose each angularly adjacent pair of slots 908 having the first length 1002a, or vice versa. In even further embodiments, it is contemplated herein that the slots 908 having the first and second lengths 1002a,b may be provided in a random slot pattern that may or may not repeat about the circumference of the antenna shield 906.

While the antenna shield 906 of FIG. 10 shows slots 908 having only two dissimilar lengths 1002a,b, it is contemplated herein that the antenna shield 906 provide slots 908 having three or more dissimilar lengths. In such embodiments, the pattern of the slots 908 having three or more dissimilar lengths may be uniform and repeat about the circumference of the antenna shield 906, or may otherwise be provided in a random pattern that may or may not repeat, without departing from the scope of the disclosure.

In any of the slot pattern scenarios described herein, the separation gap 914 between angularly adjacent slots 908 of any length 1002a,b may be uniform or instead vary about the circumference of the antenna shield 906, without departing from the scope of the disclosure.

The soft magnetic band 904 at least partially visible through the slots 908 in the antenna shield 906 of FIG. 10 may comprise the soft magnetic band 704 of FIGS. 7A-7B. Accordingly, the soft magnetic band 904 may include the plurality of stacked inserts 706 (FIGS. 7A-7B) extending perpendicular to the coil 308, and simultaneously extending parallel to the slots 908. In some embodiments, the gap 708 (FIGS. 7A-7B) separating each stacked insert 706 from angularly adjacent stacked inserts may have the same or similar magnitude (size) as the separation gap 914 that separates angularly adjacent slots 908. In such embodiments, each stacked insert 706 may be arranged such that they align radially with a corresponding slot 908. In other embodiments, however, the stacked inserts 706 may be radially misaligned with the slots 908, without departing from the scope of the disclosure.

Altering different parameters of the antenna shield 906 affects the gain sensitivity of the antenna assembly 902. Example shield parameters that can be altered (manipulated) to increase the gain sensitivity of the antenna assembly 902 include, but are not limited to, the number of slots 908 included in the antenna shield 906, the width 912 (FIG. 9) of each slot 908, and the length 916 (FIG. 9) of each slot 908. Through testing, the inventors have determined that the most efficient way to increase the gain sensitivity of the antenna assembly 902 is to maximize the length 916 of the slots 908. FIGS. 11-13 graphically depict testing data that supports this conclusion.

More particularly, FIGS. 11-13 depict test results obtained by varying the aforementioned shield parameters on an antenna assembly similar to the antenna assembly 402 of FIGS. 6A-6B and with the antenna shield similar to the antenna shield 906 of FIG. 9. Tests were performed while exciting the coil 308 (FIGS. 6A-6B) of the antenna assembly 402 at several frequencies: 500 Hz, 1 kHz, 2 kHz, 8 kHz, and 32 kHz.

FIG. 11 provides a series of plots depicting test data resulting from increasing the number of slots defined in the antenna shield. Data were obtained from two dissimilar slot designs: 1) slots having a length of 4.125 inches (in.) and a width of 0.188 in., and 2) slots having a length of 4.125 in. and a width of 0.250 in. As shown in the plots of FIG. 11, increasing the number of slots in the antenna shield results in a corresponding increase of gain percentage sensitivity.

FIG. 12 provides a series of plots depicting test data resulting from increasing the width of the slots defined in the antenna shield. Data were obtained from three antenna shield designs: 1) an antenna shield with twelve slots having a length of 4.125 in., 2) an antenna shield with twenty-four slots having a length of 4.125 in., and 3) an antenna shield with twelve slots having a length of 7.500 in. As shown in the plots of FIG. 12, increasing the width of the slots in a given antenna shield results in a corresponding increase of gain percentage sensitivity.

FIG. 13 provides a series of plots depicting test data resulting from increasing the length of the slots defined in the antenna shield. Data were obtained from one antenna shield design that including twelve slots having a width of 0.188 in. As shown in the plots of FIG. 13, increasing the length of the slots in the antenna shield results in a corresponding increase of gain percentage sensitivity.

The data and findings from FIGS. 11-13 are summarized in the following Table 1:

TABLE 1

| Shield Parameter | Frequency Range | Gain Improvement |
| --- | --- | --- |
| Doubling # of Slots | 500 Hz → 2 kH | ~3%-~7% |
| (12 → 24) | 8 kHz → 32 kH | ~10% |
| Doubling Width of Slots | 500 Hz → 2 kH | ~1%-~2% |
| (0.125 in. → 0.250 in.) | 2 kHz → 32 kH | ~3%-~7% |
| Doubling Length of Slots | 500 Hz → 1 kH | ~38% |
| (0.4 in. → 0.8 in.) | 2 kHz → 32 kH | ~50% |

From Table 1, it can be concluded that the most efficient way to increase the gain sensitivity of an antenna assembly is to maximize the length of the slots defined in the antenna shield.

Figure 14:
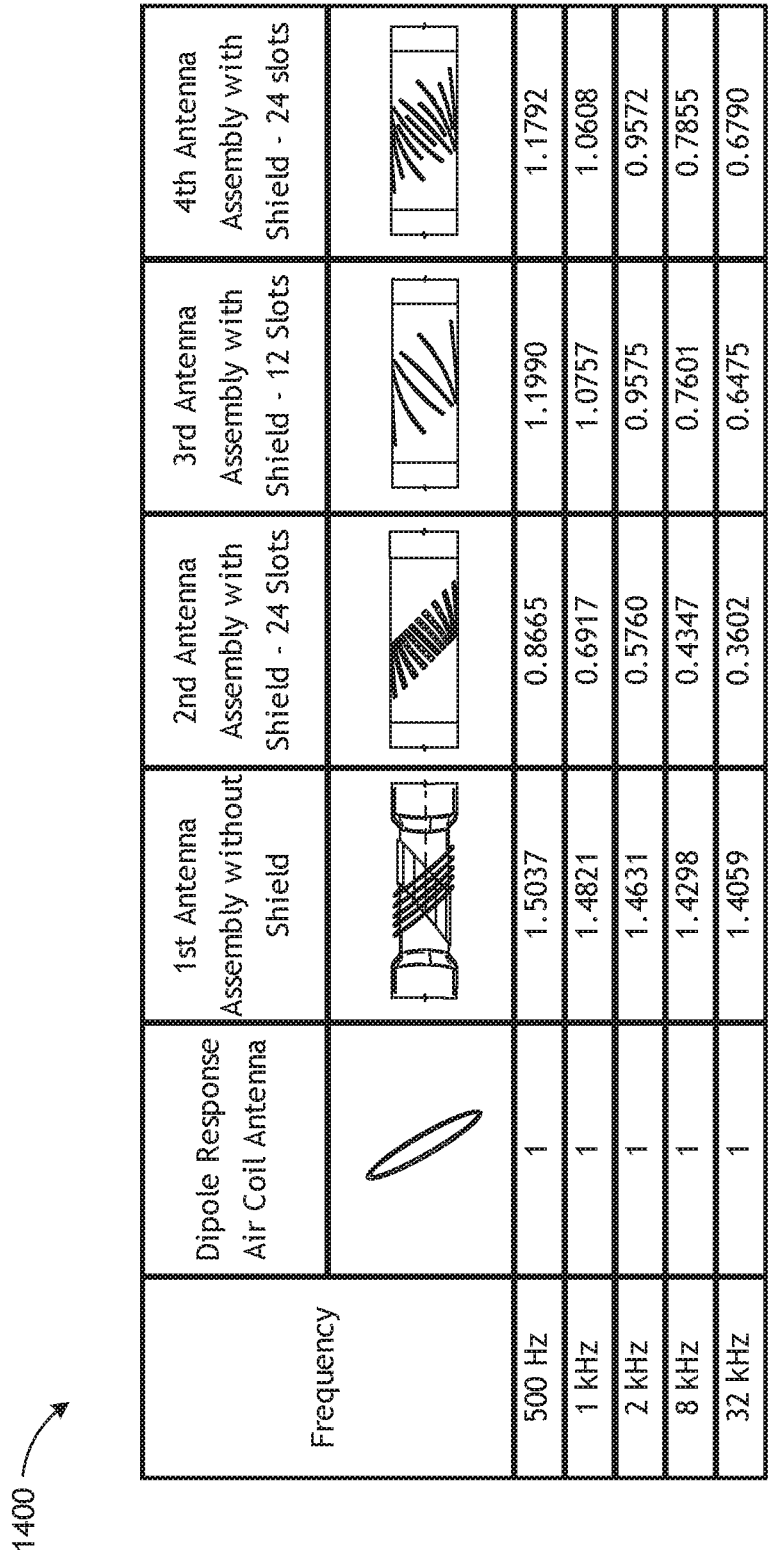
FIG. 14 is a table showing comparative test results obtained from three variations in antenna shield designs.

FIG. 14 is a table 1400 showing comparative test results obtained from three variations in antenna shield designs applied to the same antenna assembly. Tests were performed while exciting the coil of each antenna assembly at several frequencies: 500 Hz, 1 kHz, 2 kHz, 8 kHz, and 32 kHz. The antenna shield designs are compared against a dipole response for an air coil antenna, as shown in the second column. The air coil antenna is a coil antenna operating without an accompanying tool mandrel, soft magnetic band, or antenna shield and the dipole response results from coil excitation. The gain for the air coil antenna (magnetic dipole) is used as reference to calculate the gain percentage of the other antenna designs (Gain=$Gain_{Design}$/$Gain_{Dipole}$). As shown in the results of the first column, the dipole response at each frequency is 1.

The antenna shield designs are further compared against performance of a base first antenna assembly without an antenna shield, as shown in the third column. The first antenna assembly is the same as the antenna assembly 402 of FIGS. 6A-6B, and is used as the base antenna assembly for each of the second, third, and fourth antenna assemblies.

The second antenna assembly includes an antenna shield that is substantially similar to the antenna shield 906 of FIG. 9, which includes a plurality of tilted slots each having a length of length of 4.125 in. and a width of 0.188 in. The third antenna assembly includes an antenna shield having twelve tilted slots, where each slot has a length of length of 7.5 in. and a width of 0.188 in. The fourth antenna assembly includes an antenna shield that is substantially similar to the antenna shield 906 of FIG. 10, which includes twenty-four tilted slots provided with two dissimilar lengths of 7.5 in. and 4.125 in., and with a width of 0.188 in.

The data in table 1400 indicate that adding an antenna shield with tilted slots to the first antenna assembly results in a gain decrease, as shown by the data obtained from the second, third, and fourth antenna assemblies. The gain performance for the fourth antenna assembly, however, was largely superior to the gain performance of the second and third antenna assembly designs, especially at higher frequencies (e.g., 8 kHz and 32 kHz). It can be concluded, then, that having two or more dissimilar lengths of slots (long and short) in an antenna shield can increase the gain performance of a given antenna assembly while simultaneously maintaining the structural integrity of the antenna shield.

FIG. 15 is a table 1500 showing comparative test results obtained from two variations in antenna shield designs in conjunction with varying the design of the underlying soft magnetic band of an antenna assembly. Similar to table 1400 of FIG. 14, the antenna shield designs are again compared against a dipole response for an air coil antenna, as shown in the second column. Moreover, tests were again performed while exciting the coil of a given antenna assembly at several frequencies: 500 Hz, 1 kHz, 2 kHz, 8 kHz, and 32 kHz.

The antenna shield designs are also compared against two base antenna assembly designs, shown in the third column as a first antenna assembly and a fourth antenna assembly. The first antenna assembly is the same as the antenna assembly 402 of FIGS. 6A-6B, and is used as the base antenna assembly for the second and third antenna assemblies. The fourth antenna assembly is the same as the antenna assembly 702 of FIGS. 7A-7B, which includes the soft magnetic band having a plurality of stacked inserts, and is used as the base antenna assembly for the fifth and sixth antenna assemblies.

The second and fifth antenna assemblies each include an antenna shield that is substantially similar to the antenna shield 906 of FIG. 9, where the antenna shield has twenty-four tilted slots and each slot has the same uniform length. The third and sixth antenna assemblies each include an antenna shield that is substantially similar to the antenna shield 906 of FIG. 10, where the antenna shield has tilted slots provided with two dissimilar lengths (long and short).

The data in table 1500 provide a comparison of the gain performance between a base antenna assembly design with a conventional soft magnetic band (i.e., the first through third antenna assemblies) and one with stacked inserts (i.e., the fourth through sixth antenna assemblies). Table 1500 indicates that the performance of the base antenna assembly design with the conventional soft magnetic band and without an antenna shield (i.e., the first antenna assembly) is superior to the antenna assembly design with stacked inserts without an antenna shield (i.e., the fourth antenna assembly). However, when the antenna shield is included, both antenna assembly designs exhibit substantially similar performance at each frequency. This may prove useful for drilling operations that require an antenna assembly to obtain measurements while drilling. Inclusion of the antenna shield in drilling operations may be required to protect the coil from wear and damage caused by drilling debris and movement of a drill string.

FIG. 16 is a table 1600 showing comparative test results obtained from variations in antenna assembly designs having stacked inserts of a soft magnetic band aligned and misaligned with the slots of an antenna shield. Similar to tables 1400 and 1500 of FIGS. 14 and 15, respectively, the antenna shield designs are again compared against a dipole response for an air coil antenna, as shown in the second column. Tests were performed while exciting the coil of the given antenna assemblies at several frequencies: 2 kHz, 4 kHz, 8 kHz, 16 kHz, 32 kHz, and 64 kHz.

Table 1600 provides comparative test data from first, second, third, and fourth antenna assemblies. Each antenna assembly includes a soft magnetic band comprising a plurality of stacked inserts, similar to the antenna assembly 702 of FIGS. 7A-7B. Moreover, each antenna assembly is tested in conjunction with an antenna shield similar to the antenna shield 906 of FIG. 10, where the tilted slots of the antenna shield are provided with two dissimilar lengths (long and short). The antenna shield used with the first and second antenna assemblies has twenty-four tilted slots with two dissimilar lengths, and the antenna shield used with the third and fourth antenna assemblies has thirty-six tilted slots with two dissimilar lengths. The data in Table 1600 also reflects measurements obtained when the stacked inserts of the soft magnetic band of each antenna assembly are misaligned or aligned with the tilted slots. It is observed from the test results provided in Table 1600 that when the stacked inserts are aligned radially with the tilted slots, such that the stacked inserts are exposed through the radially adjacent tilted slots, the gain performance of the particular antenna assembly is superior as compared to the antenna assemblies where the stacked inserts are radially misaligned with the tilted slots.

FIG. 17 is a table 1700 showing comparative test results obtained from variations in antenna assembly designs having a soft magnetic band comprising stacked inserts with varying numbers of rods. Similar to tables 1400, 1500, and 1600 of FIGS. 14-16, respectively, the antenna shield designs are again compared against a dipole response for an air coil antenna, as shown in the second column. Moreover, tests were performed while exciting the coil of the given antenna assemblies at several frequencies: 2 kHz, 4 kHz, 8 kHz, 16 kHz, 32 kHz, and 64 kHz.

Table 1700 provides comparative test data from first, second, third, and fourth antenna assemblies. Each antenna assembly includes a soft magnetic band comprising a plurality of stacked inserts, similar in some respects to the antenna assembly 702 of FIGS. 7A-7B. Moreover, each antenna assembly is tested in conjunction with an antenna shield, similar to the antenna shield 906 of FIG. 10, where the tilted slots of the antenna shield are provided with two dissimilar lengths (long and short). The antenna shield used with the first and second antenna assemblies has twenty-four tilted slots with two dissimilar lengths, and the antenna shield used with the third and fourth antenna assemblies has thirty-six tilted slots with two dissimilar lengths.

In the testing, the number of stacked inserts and rods in the soft magnetic band of each antenna assembly was varied to determine its effect on gain performance. The soft magnetic band of the first antenna assembly, for example, includes forty-eight stacked inserts, where each stacked insert includes three rods. The soft magnetic band of the second antenna assembly includes thirty-six stacked inserts, where each stacked insert includes four rods. Consequently, the stacked inserts of the second antenna assembly are longer that the stacked inserts of the first antenna assembly. The soft magnetic band of the third antenna assembly includes thirty-six stacked inserts, where each stacked insert includes three rods. Lastly, the soft magnetic band of the fourth antenna assembly includes thirty-six stacked inserts, where each stacked insert includes four rods. Consequently, the stacked inserts of the second and fourth antenna assemblies are longer that the stacked inserts of the first and third antenna assemblies.

It is observed from the test results provided in table 1700 that antenna assemblies having soft magnetic bands with longer stacked inserts (i.e., second and fourth antenna assemblies) provide enhanced gain performance over antenna assemblies having shorter stacked inserts (i.e., first and third antenna assemblies). This is true with antenna assemblies having a comparable number of rods (i.e., 48×3=144; 36×4=144), and even were the shorter stacked insert pattern (i.e., 48×3) has denser rods. Accordingly, it may prove advantageous to stack the rods as long as possible in a direction perpendicular direction with the coil in a given stacked insert to improve performance.

Embodiments disclosed herein include:

A. An antenna assembly that includes a tool mandrel having a tool axis, a coil including a plurality of windings wrapped about the tool mandrel, wherein portions of the plurality of windings are wrapped about the tool mandrel at a winding angle offset from the tool axis, and a soft magnetic band radially interposing the coil and the tool mandrel and extending about a circumference of the tool mandrel, wherein the soft magnetic band includes a plurality of stacked inserts and each stacked insert includes a plurality of rods positioned end-to-end.

B. A method that includes introducing a wellbore logging tool into a wellbore, the wellbore logging tool including an antenna assembly that includes a tool mandrel having a tool axis, a coil including a plurality of windings wrapped about the tool mandrel, wherein portions of the plurality of windings are wrapped about the tool mandrel at a winding angle offset from the tool axis, and a soft magnetic band radially interposing the coil and the tool mandrel and extending about a circumference of the tool mandrel, wherein the soft magnetic band includes a plurality of stacked inserts and each stacked insert includes a plurality of rods positioned end-to-end. The method further includes obtaining measurements of a surrounding subterranean formation with the wellbore logging tool.

Each of embodiments A and B may have one or more of the following additional elements in any combination: Element 1: wherein the plurality of rods comprises a material selected from the group consisting of a ferrite, mu-metal, permalloy, metallic glass, and any combination thereof. Element 2: wherein the soft magnetic band interposes the coil and the tool mandrel about the entire circumference of the tool mandrel. Element 3: wherein the plurality of rods in each stacked insert cooperatively forms a corresponding straight stacked insert that follows a curvature of an outer surface of the tool mandrel while extending perpendicular to the coil. Element 4: wherein at least one rod of the plurality of rods has a length that is dissimilar to a length of other rods of the plurality of rods. Element 5: wherein each rod comprises a straight, cylindrical member that exhibits a circular or polygonal cross-section. Element 6: further comprising a bobbin positioned about the circumference of the mandrel, wherein the plurality of stacked inserts is positioned on the bobbin. Element 7: wherein the plurality of stacked inserts is positioned on an outer radial surface of the bobbin. Element 8: wherein the plurality of stacked inserts is positioned on an inner radial surface the bobbin. Element 9: further comprising an antenna shield secured to the tool mandrel and positioned radially outward from the coil, wherein the antenna shield defines a plurality of slots extending perpendicular to the coil at any angular location about the circumference of the tool mandrel. Element 10: wherein the plurality of slots is provided in two or more dissimilar lengths. Element 11: wherein the plurality of stacked inserts are aligned radially with the plurality of slots. Element 12: wherein the plurality of stacked inserts are radially misaligned with the plurality of slots. Element 13: wherein the soft magnetic band extends about the circumference of the tool mandrel at a band angle parallel to the winding angle. Element 14: wherein each stacked insert is positioned to extend perpendicular to a winding angle of the plurality of windings about the circumference of the tool mandrel.

Element 15: wherein the tool mandrel is operatively coupled to a drill string and introducing the wellbore logging tool into the wellbore further comprises extending the wellbore logging tool into the wellbore on the drill string, and drilling a portion of the wellbore with a drill bit secured to a distal end of the drill string. Element 16: wherein introducing the wellbore logging tool into the wellbore further comprises extending the wellbore logging tool into the wellbore on wireline as part of a wireline instrument sonde. Element 17: wherein the antenna assembly further includes a bobbin arranged about the circumference of the mandrel and the plurality of stacked inserts is positioned on the bobbin. Element 18: wherein the antenna assembly further includes an antenna shield secured to the tool mandrel and positioned radially outward from the coil, wherein the antenna shield defines a plurality of slots extending perpendicular to the coil at any angular location about the circumference of the tool mandrel. Element 19: wherein the plurality of slots is provided in two or more dissimilar lengths. Element 20: wherein the plurality of stacked inserts are aligned or misaligned radially with the plurality of slots.

By way of non-limiting example, exemplary combinations applicable to A and B include: Element 7 with Element 8; Element 9 with Element 10; Element 9 with Element 11; Element 9 with Element 12; Element 18 with Element 19; and Element 18 with Element 20.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An antenna assembly, comprising:
   a tool mandrel having a tool axis;
   a coil including a plurality of windings wrapped about the tool mandrel at a winding angle offset from the tool axis; and
   a soft magnetic band radially interposing the coil and the tool mandrel and extending about a circumference of the tool mandrel at a band angle parallel to the winding angle,
   wherein the soft magnetic band includes a plurality of stacked inserts extending perpendicular to the coil about the circumference of the tool mandrel and each stacked insert includes a plurality of rods positioned end-to-end, the soft magnetic band configured to increase an inductance of the coil.

2. The antenna assembly of claim 1, wherein the plurality of rods comprises a material selected from the group consisting of a ferrite, mu-metal, permalloy, metallic glass, and any combination thereof.

3. The antenna assembly of claim 1, wherein the soft magnetic band interposes the coil and the tool mandrel about the entire circumference of the tool mandrel.

4. The antenna assembly of claim 1, wherein the plurality of rods in each stacked insert cooperatively forms a corresponding straight stacked insert that follows a curvature of an outer surface of the tool mandrel while extending perpendicular to the coil.

5. The antenna assembly of claim 1, wherein at least one rod of the plurality of rods has a length that is dissimilar to a length of other rods of the plurality of rods.

6. The antenna assembly of claim 1, wherein each rod comprises a straight, cylindrical member that exhibits a circular or polygonal cross-section.

7. The antenna assembly of claim 1, further comprising a bobbin positioned about the circumference of the mandrel, wherein the plurality of stacked inserts is positioned on the bobbin.

8. The antenna assembly of claim 1, wherein the plurality of stacked inserts is positioned on an outer radial surface of the bobbin.

9. The antenna assembly of claim 8, wherein the plurality of stacked inserts is positioned on an inner radial surface the bobbin.

10. The antenna assembly of claim 1, further comprising an antenna shield secured to the tool mandrel and positioned radially outward from the coil, wherein the antenna shield defines a plurality of slots extending perpendicular to the coil at any angular location about the circumference of the tool mandrel.

11. The antenna assembly of claim 9, wherein the plurality of slots is provided in two or more dissimilar lengths.

12. The antenna assembly of claim 9, wherein the plurality of stacked inserts are aligned radially with the plurality of slots.

13. The antenna assembly of claim 9, wherein the plurality of stacked inserts are radially misaligned with the plurality of slots.

14. A method, comprising:
  introducing a wellbore logging tool into a wellbore, the wellbore logging tool including an antenna assembly that includes:
    a tool mandrel having a tool axis;
    a coil including a plurality of windings wrapped about the tool mandrel at a winding angle offset from the tool axis; and
    a soft magnetic band radially interposing the coil and the tool mandrel and extending about a circumference of the tool mandrel at a band angle parallel to the winding angle, wherein the soft magnetic band includes a plurality of stacked inserts extending perpendicular to the coil about the circumference of the tool mandrel and each stacked insert includes a plurality of rods positioned end-to-end, the soft magnetic band configured to increase an inductance of the coil; and
  obtaining measurements of a surrounding subterranean formation with the wellbore logging tool.

15. The method of claim 14, wherein the tool mandrel is operatively coupled to a drill string and introducing the wellbore logging tool into the wellbore further comprises:
  extending the wellbore logging tool into the wellbore on the drill string; and
  drilling a portion of the wellbore with a drill bit secured to a distal end of the drill string.

16. The method of claim 14, wherein introducing the wellbore logging tool into the wellbore further comprises extending the wellbore logging tool into the wellbore on wireline as part of a wireline instrument sonde.

17. The method of claim 14, wherein the antenna assembly further includes a bobbin arranged about the circumference of the mandrel and the plurality of stacked inserts is positioned on the bobbin.

18. The method of claim 14, wherein the antenna assembly further includes an antenna shield secured to the tool mandrel and positioned radially outward from the coil, wherein the antenna shield defines a plurality of slots extending perpendicular to the coil at any angular location about the circumference of the tool mandrel.

19. The method of claim 18, wherein the plurality of slots is provided in two or more dissimilar lengths.

20. The method of claim 18, wherein the plurality of stacked inserts are aligned or misaligned radially with the plurality of slots.

* * * * *